(12) United States Patent
Hirabayashi et al.

(10) Patent No.: US 10,277,281 B2
(45) Date of Patent: Apr. 30, 2019

(54) POWER FEEDING UNIT AND POWER FEEDING SYSTEM

(71) Applicant: Sony Corporation, Tokyo (JP)

(72) Inventors: Takayuki Hirabayashi, Tokyo (JP); Masakazu Yajima, Chiba (JP); Kiminobu Ichimura, Tokyo (JP)

(73) Assignee: Sony Corporation, Tokyo (JP)

( * ) Notice: Subject to any disclaimer, the term of this patent is extended or adjusted under 35 U.S.C. 154(b) by 1223 days.

(21) Appl. No.: 14/301,097

(22) Filed: Jun. 10, 2014

(65) Prior Publication Data

US 2015/0001967 A1 Jan. 1, 2015

(30) Foreign Application Priority Data

Jun. 28, 2013 (JP) .................. 2013-136223

(51) Int. Cl.
| | | |
|---|---|---|
| *H02J 17/00* | (2006.01) | |
| *H02J 5/00* | (2016.01) | |
| *H02B 5/00* | (2006.01) | |
| *H02B 5/02* | (2006.01) | |
| *H04B 5/00* | (2006.01) | |
| *H02J 50/05* | (2016.01) | |
| *H02J 50/60* | (2016.01) | |
| *H02J 7/00* | (2006.01) | |
| *H02J 7/02* | (2016.01) | |

(52) U.S. Cl.
CPC ............ *H04B 5/0037* (2013.01); *H02J 5/005* (2013.01); *H02J 7/0042* (2013.01); *H02J 7/025* (2013.01); *H02J 17/00* (2013.01); *H02J 50/05* (2016.02); *H02J 50/60* (2016.02)

(58) Field of Classification Search
CPC ............ H02J 5/005; H02J 7/025; H02J 17/00; H02N 2/008; H04B 5/0025–5/0093; B60L 5/005; B60L 11/182; B60L 11/1829–11/1831; Y02T 90/122; H01F 27/006; H01F 27/02; H01F 38/14; H01F 2038/143–2038/146; H01R 13/6633; A61N 1/3787; A61B 1/00029
USPC .......................................... 307/104; 320/108
See application file for complete search history.

(56) References Cited

U.S. PATENT DOCUMENTS

| | | | |
|---|---|---|---|
| 2006/0176015 A1 | 8/2006 | Bersenev | |
| 2006/0202665 A1 | 9/2006 | Hsu | |
| 2009/0033280 A1* | 2/2009 | Choi | H02J 7/025 320/108 |
| 2010/0224725 A1* | 9/2010 | Perlman | B60K 6/46 244/1 R |

FOREIGN PATENT DOCUMENTS

| | | | |
|---|---|---|---|
| JP | 2005-168232 A | 6/2005 | |
| JP | 2008-295274 A | 12/2008 | |
| JP | 2008-312294 A | 12/2008 | |

(Continued)

*Primary Examiner* — Rexford Barnie
*Assistant Examiner* — Thai Tran
(74) *Attorney, Agent, or Firm* — Michael Best & Friedrich LLP

(57) ABSTRACT

A power feeding unit includes: an electrode array including a plurality of power feeding electrodes arranged side by side; a power feeding section configured to supply power to a power receiving unit via the electrode array; and a setting section configured to set a power feeding condition for each of the power feeding electrodes.

18 Claims, 24 Drawing Sheets

(56) References Cited

FOREIGN PATENT DOCUMENTS

| | | |
|---|---|---|
| JP | 2009-053209 | 3/2009 |
| JP | 2009-053209 A | 3/2009 |
| JP | 2009-089520 A | 4/2009 |
| JP | 2009-531009 A | 8/2009 |
| JP | 2010-200497 A | 9/2010 |
| JP | 2010-273472 A | 12/2010 |
| JP | 2012-034546 A | 2/2012 |
| JP | 2013-078238 A | 4/2013 |
| JP | 2014-096956 A | 5/2014 |

* cited by examiner

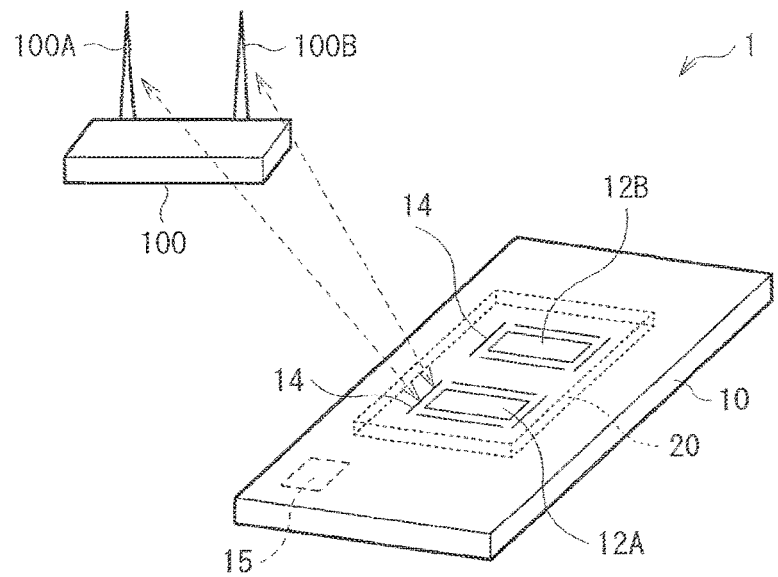
FIG. 1
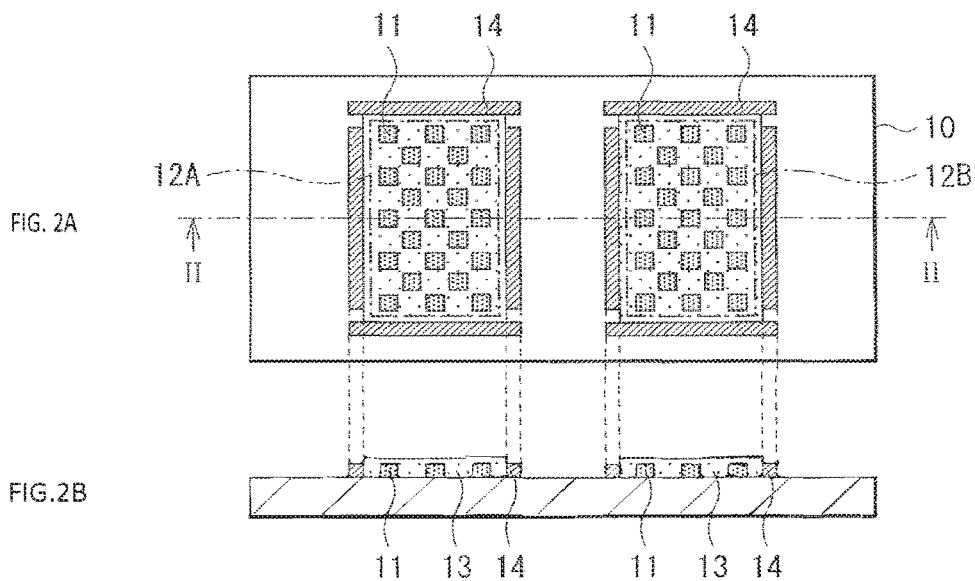
FIG. 2A
FIG. 2B

FIG. 3A
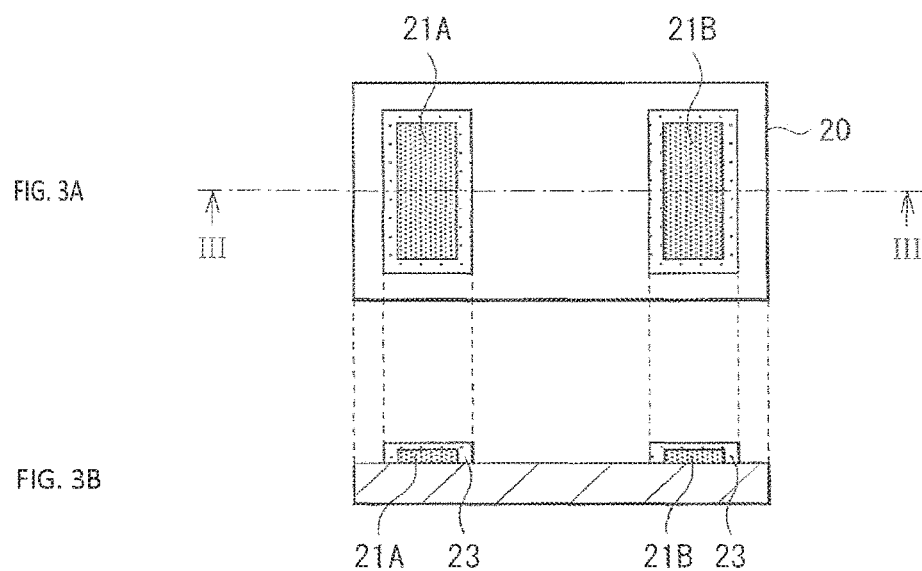
FIG. 3B
FIG. 4A
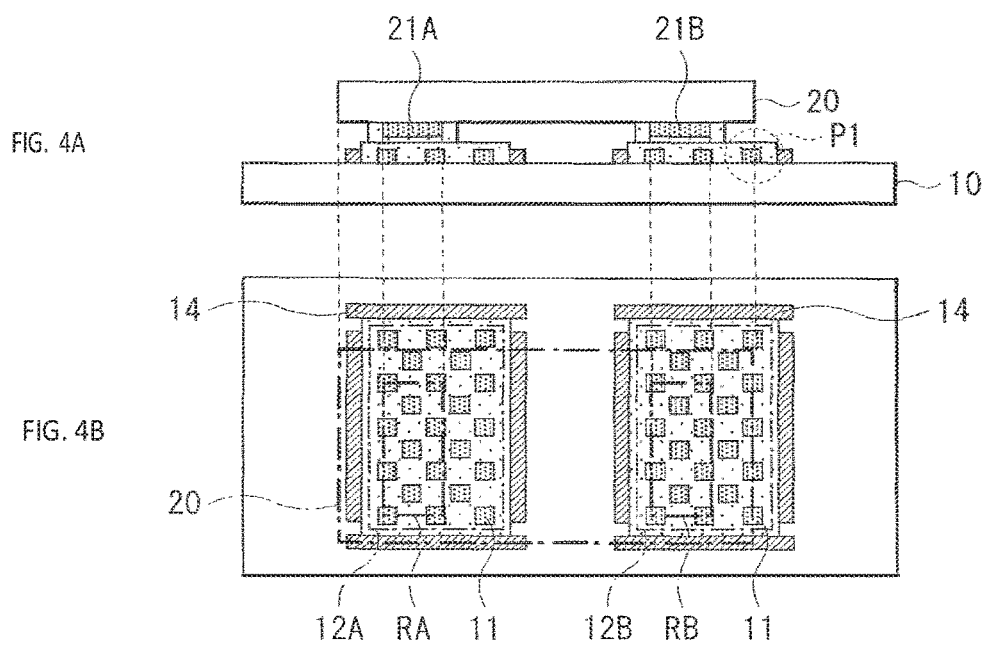
FIG. 4B

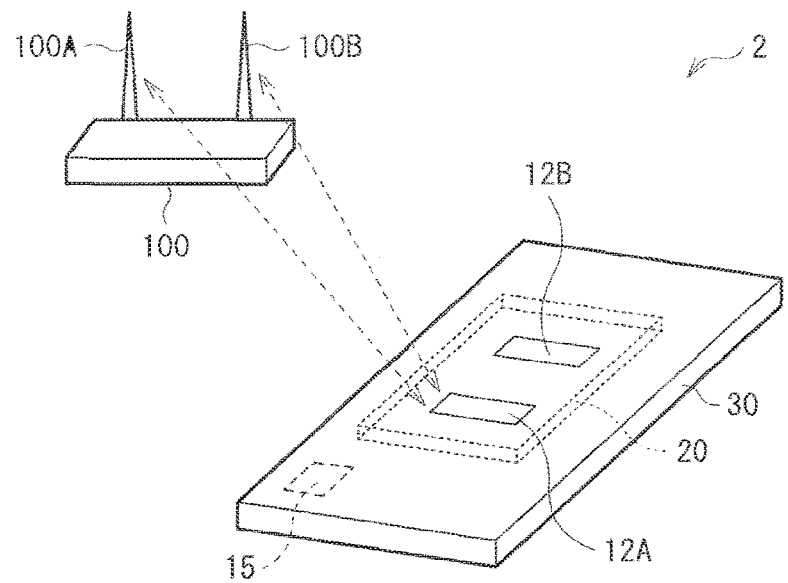
FIG. 12
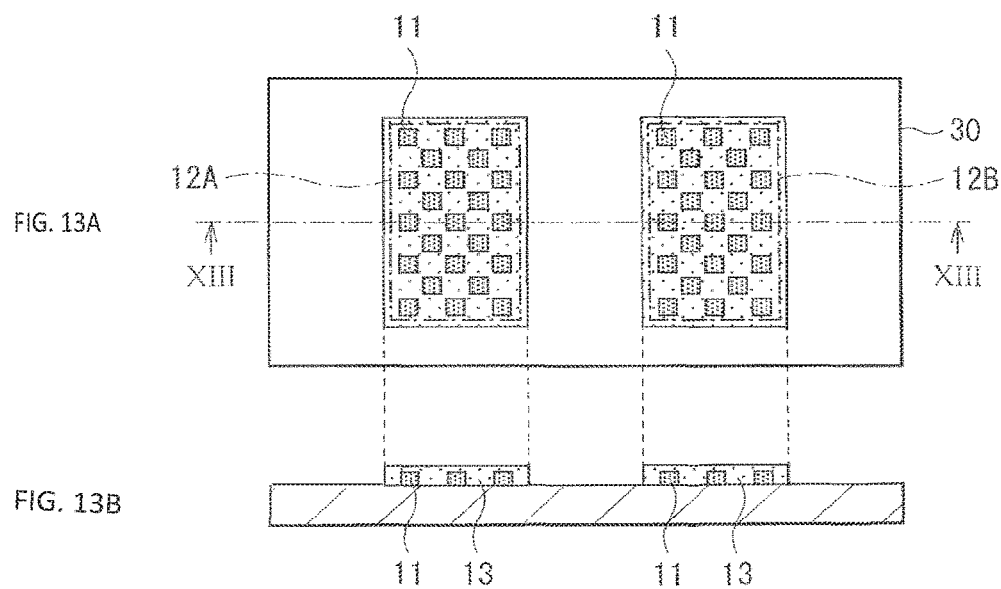
FIG. 13A
FIG. 13B

POWER FEEDING UNIT AND POWER FEEDING SYSTEM

CROSS REFERENCE TO RELATED APPLICATIONS

This application claims the benefit of Japanese Priority Patent Application JP 2013-136223 filed Jun. 28, 2013, the entire contents of which are incorporated herein by reference.

The present disclosure relates to a power feeding unit and a power feeding system configured to wirelessly supply power.

Recently, attention has been focused on a power feeding system (wireless power feeding system) configured to wirelessly supply power to consumer electronics (CE) devices such as a mobile phone and a portable music player. In such a power feeding system, for example, a mobile phone (power receiving unit) is placed on a power feeding tray (power feeding unit), thereby the mobile phone is charged. In other words, in the wireless power feeding system, power feeding is performed without connecting a power feeding unit to a power receiving unit via a cable.

Examples of a method of performing such wireless power feeding include a magnetic field coupling method such as an electromagnetic induction method, an electric field coupling method, an electromagnetic wave transmission method, and the like. Among them, the electric field coupling method has advantages such as a high degree of freedom of layout of the power receiving unit in power feeding, small leakage of an electromagnetic field, and low heat generation. For example, Japanese Unexamined Patent Application Publication (Translation of PCT Application) No. 2009-53209 discloses a power feeding unit of the electric field coupling method.

SUMMARY

In general, electronic apparatuses are desired to be safely used by a user. The power feeding system is also expected to be highly safe.

It is desirable to provide a power feeding unit and a power feeding system capable of improving safety.

According to an embodiment of the present disclosure, there is provided a power feeding unit, including: an electrode array including a plurality of power feeding electrodes arranged side by side; a power feeding section configured to supply power to a power receiving unit via the electrode array; and a setting section configured to set a power feeding condition for each of the power feeding electrodes.

According to an embodiment of the present disclosure, there is provided a power feeding system, including: a power feeding unit; and a power receiving unit, wherein the power feeding unit includes an electrode array including a plurality of power feeding electrodes arranged side by side, a power feeding section configured to supply power to the power receiving unit via the electrode array, and a setting section configured to set a power feeding condition for each of the electrodes.

In the power feeding unit and the power feeding system according to the above-described embodiments of the present disclosure, power is supplied to the power receiving unit via the electrode array. In this operation, a power supply condition is set for each of the power feeding electrodes arranged in parallel to the electrode array.

According to the power feeding unit and the power feeding system of the above-described embodiments of the present disclosure, since a power supply condition is set for each of the power feeding electrodes, safety is improved.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 1 is an explanatory diagram illustrating an exemplary configuration of a power feeding system according to a first embodiment of the present disclosure.

FIGS. 2A and 2B are a plan diagram and a sectional diagram, respectively, illustrating an exemplary configuration of a power feeding unit illustrated in FIG. 1.

FIGS. 3A and 3B are a plan diagram and a sectional diagram, respectively, illustrating an exemplary configuration of a mobile battery illustrated in FIG. 1.

FIGS. 4A and 4B are explanatory diagrams for explaining one state of the power feeding system illustrated in FIG. 1.

FIG. 12 is an explanatory diagram illustrating an exemplary configuration of a power feeding system according to a second embodiment.

FIGS. 13A and 13B are a plan diagram and a sectional diagram, respectively, illustrating an exemplary configuration of a power feeding unit illustrated in FIG. 12.

DETAILED DESCRIPTION

Figure 5:
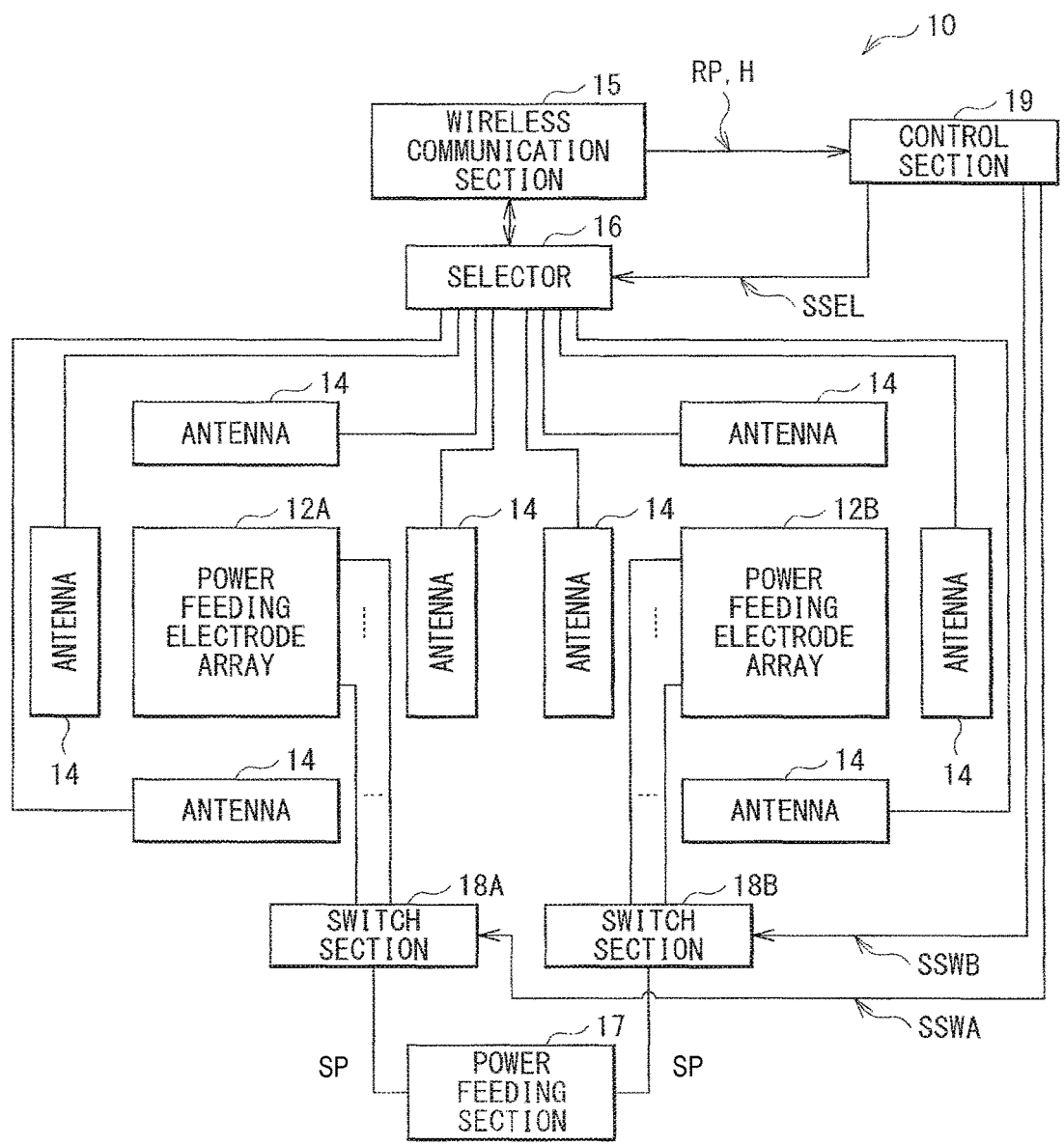
FIG. 5 is a block diagram illustrating an exemplary configuration of the power feeding unit illustrated in FIG. 1.

Hereinafter, some embodiments of the present disclosure will be described in detail with reference to the accompanying drawings. It is to be noted that description is made in the following order.
1. First Embodiment
2. Second Embodiment
3. Third Embodiment
4. Fourth Embodiment
5. Fifth Embodiment
6. Sixth Embodiment
7. Seventh Embodiment
8. Application Examples <1. First Embodiment>
[Exemplary Configuration]
FIG. 1 illustrates an exemplary configuration of a power feeding system according to a first embodiment. A power feeding system 1 is a power feeding system configured to wirelessly supply power. It is to be noted that a power feeding unit according to an embodiment of the present disclosure is embodied by the first embodiment, and is therefore described together.

The power feeding system 1 includes a power feeding unit 10 and a mobile battery 20. The power feeding unit 10 is a tray-type unit. The mobile battery 20 on the power feeding unit 10 is placed on the power feeding unit 10, thereby a battery 27 (described later) incorporated in the mobile battery 20 is charged. A plurality of power feeding electrodes 11 (described later) are disposed on a top (a side to be in contact with the mobile battery 20) of the power feeding unit 10, and power receiving electrodes 21A and 21B (described later) are disposed on a bottom (a side to be in contact with the power feeding unit 10) of the mobile battery 20. The power feeding unit 10 uses such electrodes to supply power to the mobile battery 20 through electric field coupling.

FIG. 2A illustrates a plan diagram of the power feeding unit 10. FIG. 2B illustrates a sectional configuration in a II-II arrow direction of the power feeding unit 10 illustrated in FIG. 2A. Power feeding electrode arrays 12A and 12B and eight antennas 14 are disposed on the side, which is to be in contact with the mobile battery 20, of the power feeding unit 10.

The power feeding electrode arrays 12A and 12B are each configured of a plurality of power feeding electrodes 11 arranged in parallel. The power feeding electrodes 11 are electrodes that supply power to the mobile battery 20. In this exemplary case, the power feeding electrodes 11 are arranged in a checkerboard pattern in each of the power feeding electrode arrays 12A and 12B. The power feeding electrodes 11 may be arranged in any of other patterns without being limited thereto in each of the power feeding electrode arrays 12A and 12B. Each of the power feeding electrode arrays 12A and 12B is covered with an insulator 13. Consequently, the power feeding electrodes 11 are coupled by an electric field with the power receiving electrodes 21A and 21B of the mobile battery 20 through the insulator 13 and the like.

An antenna 14 is an antenna for wireless communication of a wireless communication section 15 (described later) of the power feeding unit 10 with an access point 100. In this exemplary case, four of the eight antennas 14 are disposed so as to enclose the power feeding electrode array 12A, and the remaining four antennas 14 are disposed so as to enclose the power feeding electrode array 12B.

FIG. 3A illustrates a plan diagram of the mobile battery 20. FIG. 3B illustrates a sectional configuration in a III-III arrow direction of the mobile battery 20 illustrated in FIG. 3A. Two power receiving electrodes 21A and 21B are disposed on a side, which is to be in contact with the power feeding unit 10, of the mobile battery 20. The power receiving electrodes 21A and 21B are electrodes configured to receive power from the power feeding unit 10. The power receiving electrode 21A is disposed at a position corresponding to the power feeding electrode array 12A of the power feeding unit 10. The power receiving electrode 21B is disposed at a position corresponding to the power feeding electrode array 12B of the power feeding unit 10. Each of the power receiving electrodes 21A and 21B is covered with an insulator 23. Consequently, the power receiving electrodes 21A and 21B are each coupled by an electric field with the power feeding electrodes 11 of the power feeding unit 10 through the insulator 23 and the like.

FIGS. 4A and 4B illustrate a case where the mobile battery 20 is placed on the power feeding unit 10, in which FIG. 4A illustrates a sectional view, and FIG. 4B illustrates a relative positional relationship between the power feeding electrode arrays 12A and 12B and the power receiving electrodes 21A and 21B. As illustrated in FIGS. 4A and 4B, area of the power receiving electrode 21A is smaller than area of the power feeding electrode array 12A. Similarly, area of the power receiving electrode 21B is smaller than area of the power feeding electrode array 12B. Specifically, power feeding electrodes 11 in a region RA corresponding to the power receiving electrode 21A among the power feeding electrodes 11 in the power feeding electrode array 12A are opposed to the power receiving electrode 21A. Similarly, power feeding electrodes 11 in a region RB corresponding to the power receiving electrode 21B among the power feeding electrodes 11 in the power feeding electrode array 12B are opposed to the power receiving electrode 21B. Consequently, even if a user places the mobile battery 20 on the power feeding unit 10 in such a manner that each of the power receiving electrodes 21A and 21B is slightly displaced from the center of each of the power feeding electrode arrays 12A and 12B, the power receiving electrodes 21A and 21B are allowed to be easily opposed to the power feeding electrodes 11 in the power feeding electrode arrays 12A and 12B, respectively. Thus, in the power feeding system 1, since a user is not necessary to mind alignment between the power receiving electrodes 21A and 21B and the power feeding electrode arrays 12A and 12B, user convenience is improved.

In such a configuration, as illustrated in FIGS. 4A and 4B, when a user places the mobile battery 20 in such a manner that each of the power receiving electrodes 21A and 21B is slightly displaced from the center of each of the power feeding electrode arrays 12A and 12B, part of the power feeding electrodes 11 (a portion P1) in the power feeding electrode array 12B are protruded from a disposed region of the mobile battery 20 in this exemplary case. Hence, if the power feeding unit 10 supplies power to the mobile battery 20 using all the power feeding electrodes 11 in the power feeding electrode array 12B, and if a user touches the portion P1 by mistake, the user may be struck by electricity. During power feeding, therefore, the power feeding unit 10 supplies power to the mobile battery 20 mainly using the power feeding electrodes 11 opposed to the power receiving electrodes 21A and 21B among the power feeding electrodes 11 in the power feeding electrode arrays 12A and 12B. In other words, the power feeding unit 10 supplies power to the mobile battery 20 without using the power feeding electrodes 11 in the portion P1. Consequently, the power feeding system 1 performs power feeding more safely.

FIG. 5 illustrates an exemplary configuration of the power feeding unit 10. The power feeding unit 10 includes the power feeding electrode arrays 12A and 12B, the antennas 14, a selector 16, a wireless communication section 15, a power feeding section 17, switch sections 18A and 18B, and a control section 19.

The selector 16 sequentially selects one of the eight antennas 14 based on a selector control signal SSEL, and connects the selected antenna 14 to the wireless communication section 15.

The wireless communication section 15 performs wireless communication with the access point 100 using the antenna 14 selected by the selector 16. Specifically, in this exemplary case, the wireless communication section 15 performs wireless communication with the access point 100 having two antennas 100A and 100B via wireless local area network (LAN). The wireless communication section 15 then acquires field intensity RP at reception and a transfer function H at transmission. The field intensity RP indicates received power (a scalar value), for example, so-called received signal strength indication (RSSI). The transfer function H is a transfer function (vector values) when an electromagnetic wave W transmitted from each of the eight antennas 14 is received by each of the two antennas 100A and 100B of the access point 100. Specifically, for example, the transfer function H is expressed by the following formula:

$$\begin{pmatrix} R1 \\ R2 \end{pmatrix} = \begin{pmatrix} h11 & \ldots & h18 \\ h21 & \ldots & h28 \end{pmatrix} \begin{pmatrix} T1 \\ T2 \\ \vdots \\ T8 \end{pmatrix} \quad (1)$$

where h11 to h28 each represent a matrix component of the transfer function H, T1 to T8 each represent a transmission signal when the electromagnetic wave W is transmitted from each of the eight antennas 14, and R1 and R2 each represent a received signal when the transmission signal is received by the two antennas 100A and 100B of the access point 100. The wireless communication section 15 supplies the field intensity RP and the transfer function H to the control section 19.

Although the wireless communication section 15 performs wireless communication with the access point 100 via wireless LAN in this exemplary case, this is not limitative. Alternatively, for example, wireless communication may be performed with a base station of a mobile phone via Long Term Evolution (LTE), for example. Alternatively, for example, wireless communication may be performed with another electronic apparatus via Bluetooth (registered trademark), for example.

The power feeding section 17 generates an AC power signal SP between two ends thereof. A first end of the power feeding section 17 is connected to the switch section 18A, and a second end thereof is connected to the switch section 18B. For example, voltage amplitude of the power signal SP may be 1000 [Vpp], and frequency thereof may be 50 [kHz].

The switch section 18A selects one or more power feeding electrodes 11 to be used for power feeding among the power feeding electrodes 11 in the power feeding electrode array 12A based on the switch control signal SSWA, and connects the selected power feeding electrodes 11 to the first end of the power feeding section 17. The switch section 18B selects one or more power feeding electrodes 11 to be used for power feeding among the power feeding electrodes 11 in the power feeding electrode array 12B based on the switch control signal SSWB, and connects the selected power feeding electrodes 11 to the second end of the power feeding section 17.

The control section 19 controls the selector 16 via the selector control signal SSEL to acquire the field intensity RP and the transfer function H from the wireless communication section 15, and controls the switch sections 18A and 18B via the switch control signals SSWA and SSWB based on the field intensity RP and the transfer function H. Specifically, as described later, first, the control section 19 controls the selector 16 via the selector control signal SSEL, and thus sequentially connects one of the eight antennas 14 to the wireless communication section 15 to acquire the field intensity RP and the transfer function H from the wireless communication section 15. As described later, the field intensity RP and the transfer function H are each in accordance with a relative positional relationship between the power feeding unit 10 and the mobile battery 20 on the power feeding unit 10. The control section 19 determines the power feeding electrodes 11 to be used for power feeding among the power feeding electrodes 11 in the power feeding electrode arrays 12A and 12B based on the field intensity RP and the transfer function H, and controls the switch sections 18A and 18B via the switch control signals SSWA and SSWB to connect the power feeding electrodes 11 to be used for power feeding to the power feeding section 17.

Figure 6:
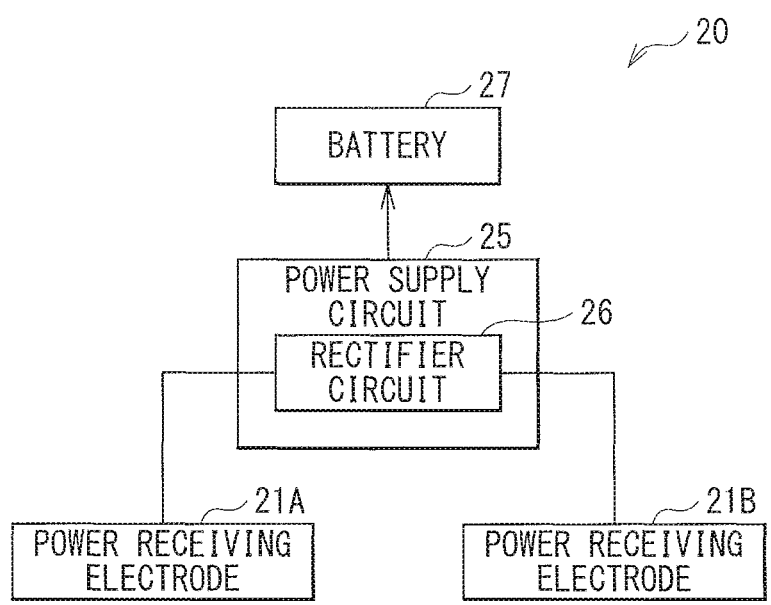
FIG. 6 is a block diagram illustrating an exemplary configuration of the mobile battery illustrated in FIG. 1.

FIG. 6 illustrates an exemplary configuration of the mobile battery 20. The mobile battery 20 includes a power supply circuit 25 and the battery 27 in addition to the power receiving electrodes 21A and 21B. The power supply circuit 25 generates a voltage suitable for charge of the battery 27 based on a voltage generated between the power receiving electrodes 21A and 21B. The power supply circuit 25 includes a rectifier circuit 26. The rectifier circuit 26 rectifies a voltage (an AC signal) generated between the power receiving electrodes 21A and 21B, and is configured of a diode, for example. The power supply circuit 25 generates a voltage suitable for charge of the battery 27 based on the rectified signal, and charges the battery 27. The battery 27 stores power supplied from the power supply circuit 25, and is configured of a rechargeable battery (secondary battery) such as, for example, a lithium ion battery.

The power feeding electrode arrays 12A and 12B each correspond to a specific but not limitative example of "electrode array" in one embodiment of the disclosure. The control section 19 corresponds to a specific but not limitative example of "setting section" in one embodiment of the disclosure. The wireless communication section 15 corresponds to a specific but not limitative example of "communication section" in one embodiment of the disclosure.

[Operation and Functions]

Operation and functions of the power feeding system 1 according to the first embodiment are now described.

(Summary of Overall Operation)

First, summary of overall operation of the power feeding system 1 is described with reference to FIGS. 5 and 6. In the power feeding unit 10, the selector 16 sequentially selects one of the eight antennas 14 based on the selector control signal SSEL, and connects the selected antenna 14 to the wireless communication section 15. The wireless communication section 15 performs wireless communication with the access point 100 using the selected antenna 14 to acquire the field intensity RP and the transfer function H. The power feeding section 17 generates the AC power signal SP between the two ends thereof. The switch section 18A selects one or more power feeding electrodes 11 to be used for power feeding among the power feeding electrodes 11 in the power feeding electrode array 12A based on the switch control signal SSWA, and connects the selected power feeding electrodes 11 to the first end of the power feeding section 17. The switch section 18B selects one or more power feeding electrodes 11 to be used for power feeding among the power feeding electrodes 11 in the power feeding electrode array 12B based on the switch control signal SSWB, and connects the selected power feeding electrodes 11 to the second end of the power feeding section 17. The control section 19 controls the selector 16 via the selector control signal SSEL to acquire the field intensity RP and the transfer function H from the wireless communication section 15, and controls the switch sections 18A and 18B via the switch control signals SSWA and SSWB based on the field intensity RP and the transfer function H. Consequently, the power feeding unit 10 supplies power to the mobile battery 20 using the selected power feeding electrodes 11 in each of the power feeding electrode arrays 12A and 12B.

In the mobile battery 20, the power receiving electrodes 21A and 21B receive power from the mobile battery 20. The power supply circuit 25 generates a voltage suitable for charge of the battery 27 based on a voltage generated between the power receiving electrodes 21A and 21B. The battery 27 stores power supplied from the power supply circuit 25.

(Detailed Operation)

Figure 7:
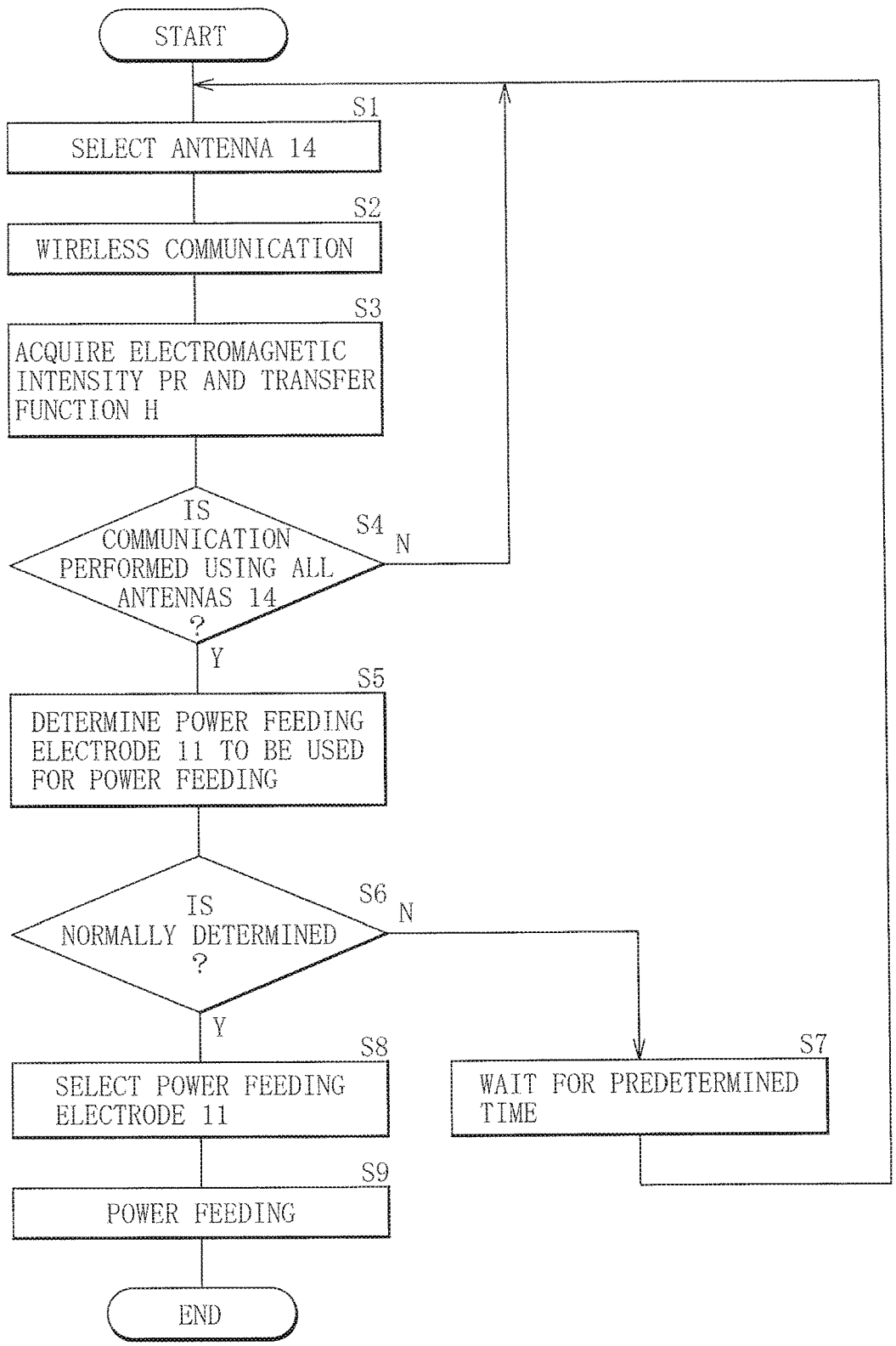
FIG. 7 is a flowchart illustrating an exemplary operation of the power feeding system illustrated in FIG. 1.

FIG. 7 is a flowchart illustrating an exemplary operation of the power feeding system 1. In the power feeding system 1, the wireless communication section 15 of the power feeding unit 10 performs wireless communication with the access point 100 using the antennas 14, and acquires the field intensity RP and the transfer function H. The control section 19 determines the power feeding electrodes 11 to be used for power feeding among the power feeding electrodes 11 in the power feeding electrode arrays 12A and 12B based on the field intensity RP and the transfer function H. This is described in detail below.

First, the control section 19 controls the selector 16 via the selector control signal SSEL to connect one of the eight antennas 14 to the wireless communication section 15 (step S1).

Subsequently, the wireless communication section 15 performs wireless communication with the access point 100 using the antenna 14 selected in step S1 (step S2).

Subsequently, the wireless communication section 15 acquires field intensity RP and transfer function H through wireless communication in step S2, and supplies the field intensity RP and the transfer function H to the control section 19 (step S3).

Subsequently, the control section 19 checks whether or not communication is performed using all the eight antennas 14 (step S4). When communication is performed using all the antennas 14, the process is advanced to step S5. When communication is not performed using all the antennas 14, the process is returned to step S1, and another antenna 14 is selected. In this way, steps S1 to S4 are repeated until communication is performed using all the antennas 14.

When the control section 19 determines that communication is performed using all the eight antennas 14 in step S4, the control section 19 determines the power feeding electrodes 11 to be used for power feeding based on the field intensity RP and the transfer function H acquired in steps S1 to S4 (step S5). Specifically, since the field intensity RP and the transfer function H are each varied depending on a relative positional relationship between the power feeding unit 10 and the mobile battery 20 on the power feeding unit 10, the control section 19 grasps the positional relationship based on the field intensity RP and the transfer function H, and determines the power feeding electrodes 11 to be used for power feeding.

Figure 8:
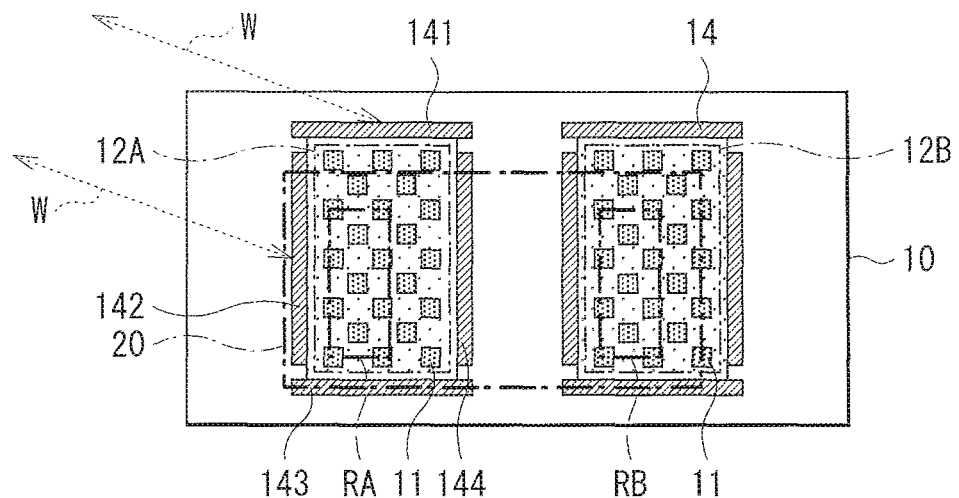
FIG. 8 is an explanatory diagram for explaining an exemplary operation of the power feeding system illustrated in FIG. 1.

FIG. 8 illustrates operation of determining the power feeding electrodes 11. Hereinafter, for convenience of description, among the four antennas 14 disposed in the periphery of the power feeding electrode array 12A, an antenna disposed on an upper side of the power feeding electrode array 12A is denoted as antenna 141, an antenna disposed on a left side of the power feeding electrode array 12A is denoted as antenna 142, an antenna disposed on a lower side of the power feeding electrode array 12A is denoted as antenna 143, and an antenna disposed on a right side of the power feeding electrode array 12A is denoted as antenna 144.

In this exemplary case, the mobile battery 20 is disposed while being slightly shifted in a lower left direction of FIG. 8 on the power feeding unit 10. Specifically, the region RA corresponding to the power receiving electrode 21A is located at the lower left in a region of the power feeding electrode array 12A. Similarly, the region RB corresponding to the power receiving electrode 21B is located at the lower left in a region of the power feeding electrode array 12B. In this exemplary case, the wireless communication section 15 receives the electromagnetic wave W coming from the upper left direction of FIG. 8 using the antennas 141 to 144. In this case, the field intensity RP of the electromagnetic wave W received by the antennas 143 and 144 is lower than the field intensity RP of the electromagnetic wave W received by the antennas 141 and 142, respectively, since part of the electromagnetic wave W is interrupted by the mobile battery 20 placed on the power feeding unit 10. Furthermore, since propagation characteristics of the electromagnetic wave are varied by such interruption of the electromagnetic wave, amplitude and a phase of each matrix component of the transfer function H are also varied depending on a placed position of the mobile battery 20.

The control section 19 determines a place, at which the power receiving electrode 21A is disposed, within a region of the power feeding electrode array 12A based on the field intensity RP and the transfer function H. The control section 19 then determines power feeding electrodes 11 in the region RA, in which the power receiving electrode 21A is determined to be disposed, as the power feeding electrodes 11 to be used for power feeding among the power feeding electrodes 11 in the power feeding electrode array 12A. Similarly, the control section 19 determines power feeding electrodes 11 in the region RB, in which the power receiving electrode 21B is determined to be disposed, as the power feeding electrodes 11 to be used for power feeding among the power feeding electrodes 11 in the power feeding electrode array 12B.

Subsequently, the control section 19 determines whether or not the power feeding electrodes 11 to be used for power feeding are normally determined in step S5 (step S6). In other words, the control section 19 determines whether or not the mobile battery 20 is placed on the power feeding unit 10.

For example, when the mobile battery 20 is not placed on the power feeding unit 10, the field intensity RP concerning any of the antennas 141 to 144 are high, and an amplitude value of any of matrix components of the transfer function H is a high value. Such field intensity RP and transfer function H each have a special pattern different from that of each of the field intensity RP and the transfer function H in the case where the mobile battery 20 is placed on the power feeding unit 10. When an object other than the mobile battery 20 is placed on the power feeding unit 10, field intensity RP and a transfer function H are different from the field intensity RP and the transfer function H, respectively, in the case where the mobile battery 20 is placed on the power feeding unit 10.

Figure 9:
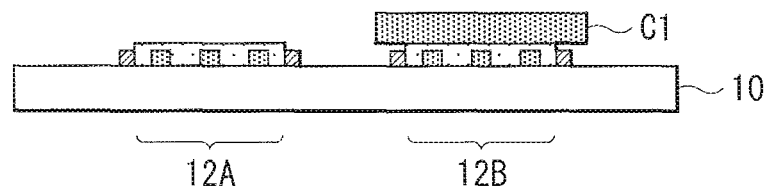
FIG. 9 is an explanatory diagram for explaining another state of the power feeding system illustrated in FIG. 1.
Figure 10:
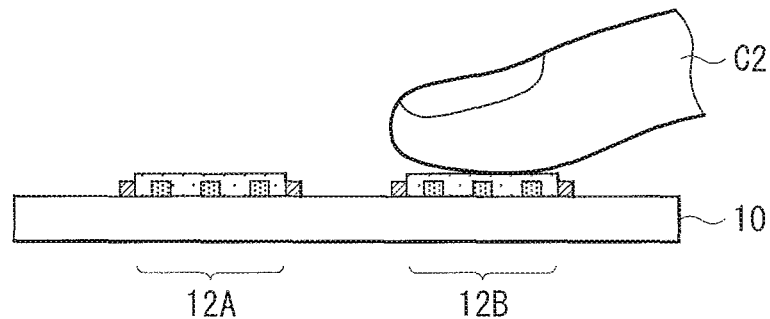
FIG. 10 is an explanatory diagram for explaining another state of the power feeding system illustrated in FIG. 1.

FIG. 9 illustrates a case where a conductor C1 exists on the power feeding electrode array 12B. FIG. 10 illustrates a case where a human finger exists on the power feeding electrode array 12B. In such a case, field intensity RP and a transfer function H each have a special pattern. For example, field intensity RP concerning any of the antennas 141 to 144 has a low value, and an amplitude value of any of the matrix components of the transfer function H has a low value. Alternatively, field intensity RP and matrix components of a transfer function H concerning two opposed antennas among the antennas 141 to 144 are different from field intensity RP and matrix components of a transfer function H, respectively, concerning other two antennas.

When each of the field intensity RP and the transfer function H has such a special pattern, the control section 19 determines that the power feeding electrodes 11 to be used for power feeding are not allowed to be normally determined.

When the control section 19 determines that the power feeding electrodes 11 to be used for power feeding are not allowed to be normally determined in this way, the process is advanced to step S7, and steps S21 to S26 are repeated after waiting for a predetermined time. When the control section 19 determines that the power feeding electrodes 11 to be used for power feeding are normally determined, the process is advanced to step S8.

Subsequently, the control section 19 controls the switch section 18A via the switch control signal SSWA to connect the power feeding electrodes 11 to be used for power feeding among the power feeding electrodes 11 in the power feeding electrode array 12A to the first end of the power feeding section 17, and controls the switch section 18B via the switch control signal SSWB to connect the power feeding electrodes 11 to be used for power feeding among the power feeding electrodes 11 in the power feeding electrode array 12B to the second end of the power feeding section 17 (step S8).

The power feeding section 17 generates an AC power signal SP between the two ends thereof, and the power feeding unit 10 supplies power to the mobile battery 20 (step S9).

This the end of this flow.

In this way, in the power feeding system 1, the power feeding electrode arrays 12A and 12B are larger than the power receiving electrodes 21A and 21B, respectively. Consequently, even if a user places the mobile battery 20 on the power feeding unit 10 in such a manner that each of the power receiving electrodes 21A and 21B is slightly displaced from the center of each of the power feeding electrode arrays 12A and 12B, the power receiving electrodes 21A and 21B are allowed to be easily opposed to the power feeding electrodes 11 in the power feeding electrode arrays 12A and 12B, respectively, and thus user convenience is improved.

In the power feeding system 1, the wireless communication section 15 performs wireless communication with the access point 100 using the antennas 14 to acquire the field intensity RP and the transfer function H, and the control section 19 determines the power feeding electrodes 11 to be used for power feeding based on the field intensity RP and the transfer function H. Consequently, for example, as illustrated in FIG. 4, even if the mobile battery 20 is placed such that each of the power receiving electrodes 21A and 21B is slightly displaced from the center of each of the power feeding electrode arrays 12A and 12B, safety is improved during power feeding. Specifically, in such a case, the control section 19 is allowed to control such that the power feeding electrodes 11 opposed to the power receiving electrodes 21A and 21B are mainly used for power feeding among the power feeding electrodes 11 in the power feeding electrode arrays 12A and 12B, and the power feeding electrodes 11 (near the portion P1 in FIG. 4) that are not opposed to the power receiving electrodes 21A and 21B are not used for power feeding. Consequently, in the power feeding system 1, even if a user touches the portion P1 by mistake, it is possible to reduce a possibility of an electric shock of the user, and improve safety during power feeding.

In addition, in the power feeding system 1, the wireless communication section 15 performs wireless communication with the access point 100 using wireless LAN to acquire the field intensity RP and the transfer function H. Specifically, since existing standardized communication technique is allowed to be used, it is possible to reduce development cost, and reduce component cost through using general-purpose products.

[Effects]

As described above, in the first embodiment, the power feeding electrode array is larger than the power receiving electrode, and the power feeding electrodes to be used for power feeding are selected among the power feeding electrodes in each power feeding electrode array; hence, it is possible to improve user convenience, and improve safety during power feeding.

In the first embodiment, the field intensity RP and the transfer function H are acquired through wireless communication with the access point 100 using wireless LAN; hence, it is possible to reduce development cost and component cost.

[Modification 1-1]

Although the wireless communication section 15 performs wireless communication with the access point 100 before power feeding, this is not limitative. For example, wireless communication may be performed during power feeding. Modification 1-1 is now described in detail.

Figure 11:
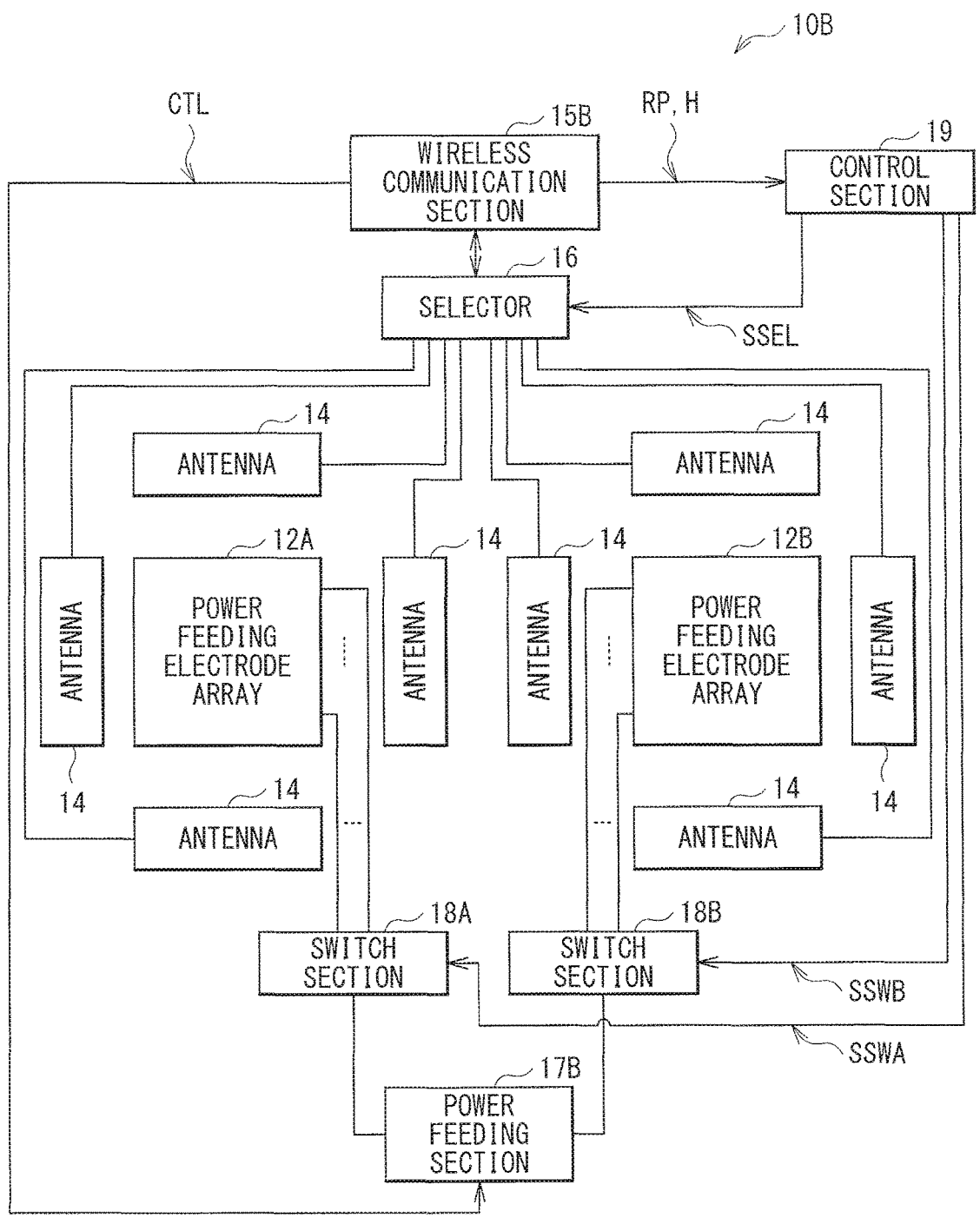
FIG. 11 is a block diagram illustrating an exemplary configuration of a power feeding unit according to a modification of the first embodiment.

FIG. 11 illustrates an exemplary configuration of a power feeding unit 10B according to the Modification 1-1. The power feeding unit 10B includes a wireless communication section 15B and a power feeding section 17B. Before power feeding, the wireless communication section 15B performs operation similar to that of the wireless communication section 15 according to the first embodiment. The wireless communication section 15B also performs wireless communication with the access point 100 using the antennas 14 during power feeding, and detects whether or not a person exists around the power feeding unit 10B based on a state of the wireless communication (for example, the field intensity RP and the transfer function H), and generates a control signal CTL corresponding to results of the detection. The power feeding section 17B performs operation similar to that of the power feeding section 17 according to the first embodiment before power feeding, and performs or stops power feeding based on the control signal CTL during power feeding. According to such a configuration, if a person exists around the power feeding unit 10B during power feeding, power feeding is allowed to be stopped; hence, it is possible to improve safety during power feeding.

In the case of the first embodiment, for example, when the power feeding system is used as a power feeding system in which a digital camera is used in place of the mobile battery 20, and a battery incorporated in the digital camera is charged, the power feeding unit 10 may acquire photograph data from the digital camera during power feeding, and may transfer the photograph data to, for example, network attached storage (NAS) via the access point 100.

[Modification 1-2]

Although the first embodiment is configured such that the power feeding electrodes 11 to be used for power feeding are selected among the power feeding electrodes 11 in the power feeding electrode arrays 12A and 12B, this is not limitative. Alternatively, for example, a power feeding condition may be set for each of the power feeding electrodes 11 in the power feeding electrode arrays 12A and 12B. Specifically, for example, it may be configured that, among the power feeding electrodes 11 in the power feeding electrode arrays 12A and 12B, the power feeding electrodes 11 opposed to the power receiving electrodes 21A and 21B supply large power, while the power feeding electrodes 11 that are not opposed to the power receiving electrodes 21A and 21B supply small power.

[Modification 1-3]

Although four antennas 14 are disposed so as to enclose the power feeding electrode array 12A and four antennas 14 are disposed so as to enclose the power feeding electrode array 12B in the first embodiment, this is not limitative. Alternatively, for example, three or less or five or more antennas 14 may be disposed so as to enclose the power feeding electrode array 12A, and three or less or five or more antennas 14 may be disposed so as to enclose the power feeding electrode array 12B.

[Modification 1-4]

Although the access point 100 includes the two antennas 100A and 100B in the first embodiment, this is not limitative. Alternatively, for example, the access point 100 may include one antenna or three or more antennas.

[Modification 1-5]

Although the control section 19 selects the power feeding electrodes 11 to be used for power feeding among the power feeding electrodes 11 in the power feeding electrode arrays 12A and 12B based on the field intensity RP and the transfer function H in the first embodiment, this is not limitative. Alternatively, for example, the power feeding electrodes 11 to be used for power feeding may be selected based on one of the field intensity RP and the transfer function H.

[Modification 1-6]

Although the wireless communication section 15 acquires the field intensity RP at reception in the first embodiment, this is not limitative. Alternatively, the wireless communication section 15 may acquire a transfer function at reception. The transfer function at reception is similar to the transfer function H at transmission (Formula (1)), and corresponds to a transfer function when an electromagnetic wave W transmitted from each of the two antennas 100A and 100B of the access point 100 is received by each of the eight antennas 14.

<2. Second Embodiment>

A power feeding system 2 according to a second embodiment is now described. The second embodiment is configured such that the wireless communication section 15 performs wireless communication using the power feeding electrodes 11 as antennas. It is to be noted that substantially the same components as those of the power feeding system 1 according to the first embodiment are designated by the same numerals, and description of them is appropriately omitted.

FIG. 12 illustrates an exemplary configuration of a power feeding system 2 according to the second embodiment. The power feeding system 2 includes a power feeding unit 30. In the power feeding unit 30, the wireless communication section 15 performs wireless communication with the access point 100 using the power feeding electrodes 11 in the power feeding electrode arrays 12A and 12B. Specifically, although the wireless communication section 15 according to the first embodiment performs wireless communication using the antennas 14, the wireless communication section 15 according to the second embodiment performs wireless communication using the power feeding electrodes 11 as antennas.

FIG. 13A illustrates a plan diagram of the power feeding unit 30, and FIG. 13B illustrates a sectional configuration of the power feeding unit 30 illustrated in FIG. 13A along a XIII-XIII arrow direction. The power feeding unit 30 includes power feeding electrode arrays 12A and 12B. In other words, the power feeding unit 30 has a configuration similar to the configuration of the power feeding unit 10 according the first embodiment except that the antennas 14 are omitted. The power feeding electrodes 11 in the power feeding electrode arrays 12A and 12B supply power to the mobile battery 20, and serve as antennas when the wireless communication section 15 performs wireless communication before power feeding.

Figure 14:
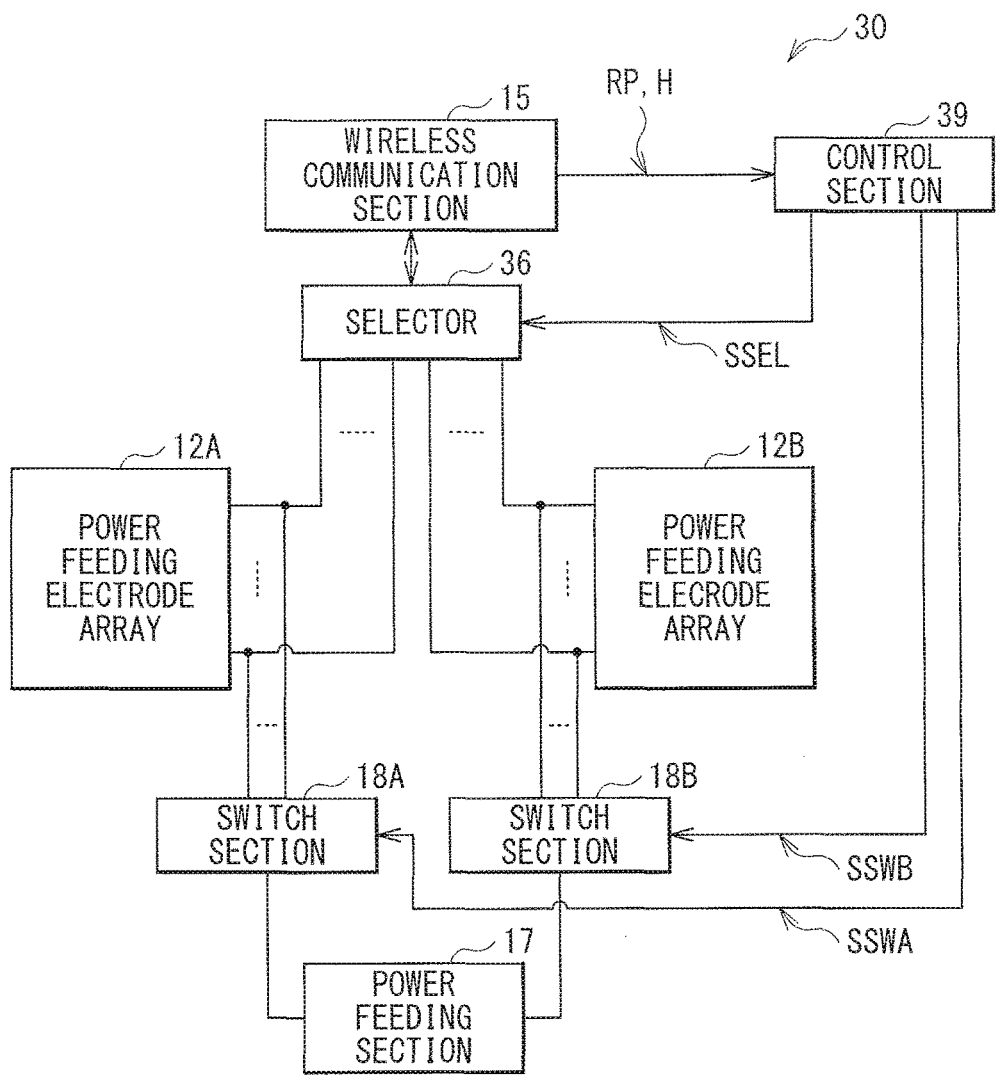
FIG. 14 is a block diagram illustrating an exemplary configuration of the power feeding unit illustrated in FIG. 12.

FIG. 14 illustrates an exemplary configuration of the power feeding unit 30. The power feeding unit 30 includes a selector 36 and a control section 39.

The selector 36 sequentially selects one of a plurality of power feeding electrodes 11 in the power feeding electrode arrays 12A and 12B based on the selector control signal SSEL, and connects the selected power feeding electrode 11 to the wireless communication section 15. The wireless communication section 15 performs wireless communication with the access point 100 using, as an antenna, the power feeding electrode 11 selected by the selector 36, thereby acquires field intensity RP and a transfer function H, and supplies the field intensity RP and the transfer function H to the control section 39.

As with the control section 19 according to the first embodiment, the control section 39 controls the selector 36 via the selector control signal SSEL to acquire the field intensity RP and the transfer function H from the wireless communication section 15, and controls the switch sections 18A and 18B via the switch control signals SSWA and SSWB based on the field intensity RP and the transfer function H.

Figure 15:
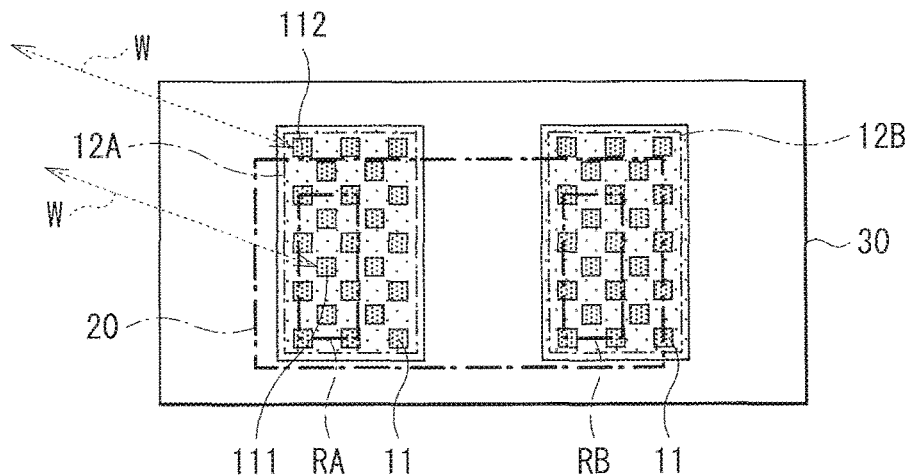
FIG. 15 is an explanatory diagram for explaining an exemplary operation of the power feeding system illustrated in FIG. 12.

FIG. 15 illustrates operation of determining the power feeding electrodes 11. In this exemplary case, the region RA corresponding to the power receiving electrode 21A is located at the lower left in a region of the power feeding electrode array 12A. Similarly, the region RB is located at the lower left in a region of the power feeding electrode array 12B. In this case, field intensity RP of an electromagnetic wave W received by a power feeding electrode 11 (for example, a power feeding electrode 111) opposed to the power receiving electrode 21A among the power feeding electrodes 11 in the power feeding electrode array 12A is lower than field intensity RP of an electromagnetic wave W received by a power feeding electrode 11 (for example, a power feeding electrode 112) that is not opposed to the power receiving electrode 21A. In other words, since part of the electromagnetic wave W transmitted from the access point 100 to the power feeding electrode 111 is interrupted by the power receiving electrode 21A, the field intensity RP of the power feeding electrode 111 becomes lower. Furthermore, since propagation characteristics of the electromagnetic wave are varied by such interruption of the electromagnetic wave, amplitude and a phase of each matrix component of the transfer function H are also varied depending on a placed position of the mobile battery 20.

The control section 39 determines a place, at which the power receiving electrode 21A is disposed, within a region of the power feeding electrode array 12A based on the field intensity RP and the transfer function H. The control section 39 determines the power feeding electrodes 11 in the region RA, in which the power receiving electrode 21A is determined to be disposed, as power feeding electrodes 11 to be used for power feeding among the power feeding electrodes 11 in the power feeding electrode array 12A.

In this way, in the power feeding unit 30, the wireless communication section 15 performs wireless communication using the power feeding electrode 11 as an antenna. Consequently, the antennas 14 are allowed to be omitted; hence, it is possible to reduce component cost and make appearance to be simpler. Moreover, since the power feeding electrodes 11 that perform power feeding are also used as antennas for wireless communication, it is possible to highly accurately determine the power feeding electrodes 11 opposed to the power receiving electrodes 21A and 21B, and therefore possible to perform power feeding control more finely.

As described above, in the second embodiment, since the wireless communication section performs wireless communication using the power feeding electrodes as antennas, it is possible to reduce component cost and make appearance to be simpler.

In the second embodiment, since the power feeding electrodes that perform power feeding are also used as antennas for wireless communication, it is possible to highly accurately determine the power feeding electrodes opposed to the power receiving electrodes and perform power feeding control more finely.

Other effects are similar to those in the case of the first embodiment.

[Modification 2-1]

Any of the Modifications of the first embodiment may be appropriately applied to the power feeding system 2 according to the second embodiment.

<3. Third Embodiment>

A power feeding system 3 according to a third embodiment is now described. The third embodiment is configured such that a power feeding unit has two wireless communication sections that perform wireless communication with each other using antennas 14 different from each other. It is to be noted that substantially the same components as those of the power feeding system 1 according to the first embodiment are designated by the same numerals, and description of them is appropriately omitted.

Figure 16:
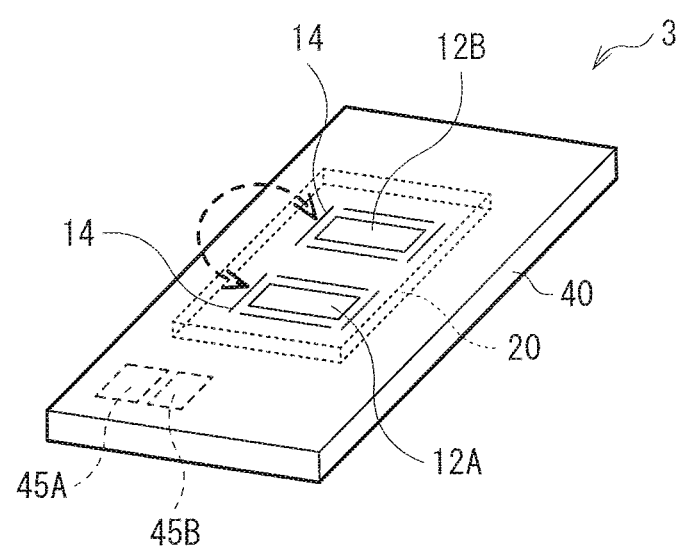
FIG. 16 is an explanatory diagram illustrating an exemplary configuration of a power feeding system according to a third embodiment.

FIG. 16 illustrates an exemplary configuration of a power feeding system 3 according to the third embodiment. The power feeding system 3 includes a power feeding unit 40. In the power feeding unit 40, two wireless communication sections 45A and 45B (described later) perform wireless communication with each other using antennas 14 different from each other. Specifically, although the wireless communication section 15 according to the first embodiment performs wireless communication with the access point 100, the wireless communication sections 45A and 45B according to the third embodiment perform wireless communication with each other.

Figure 17:
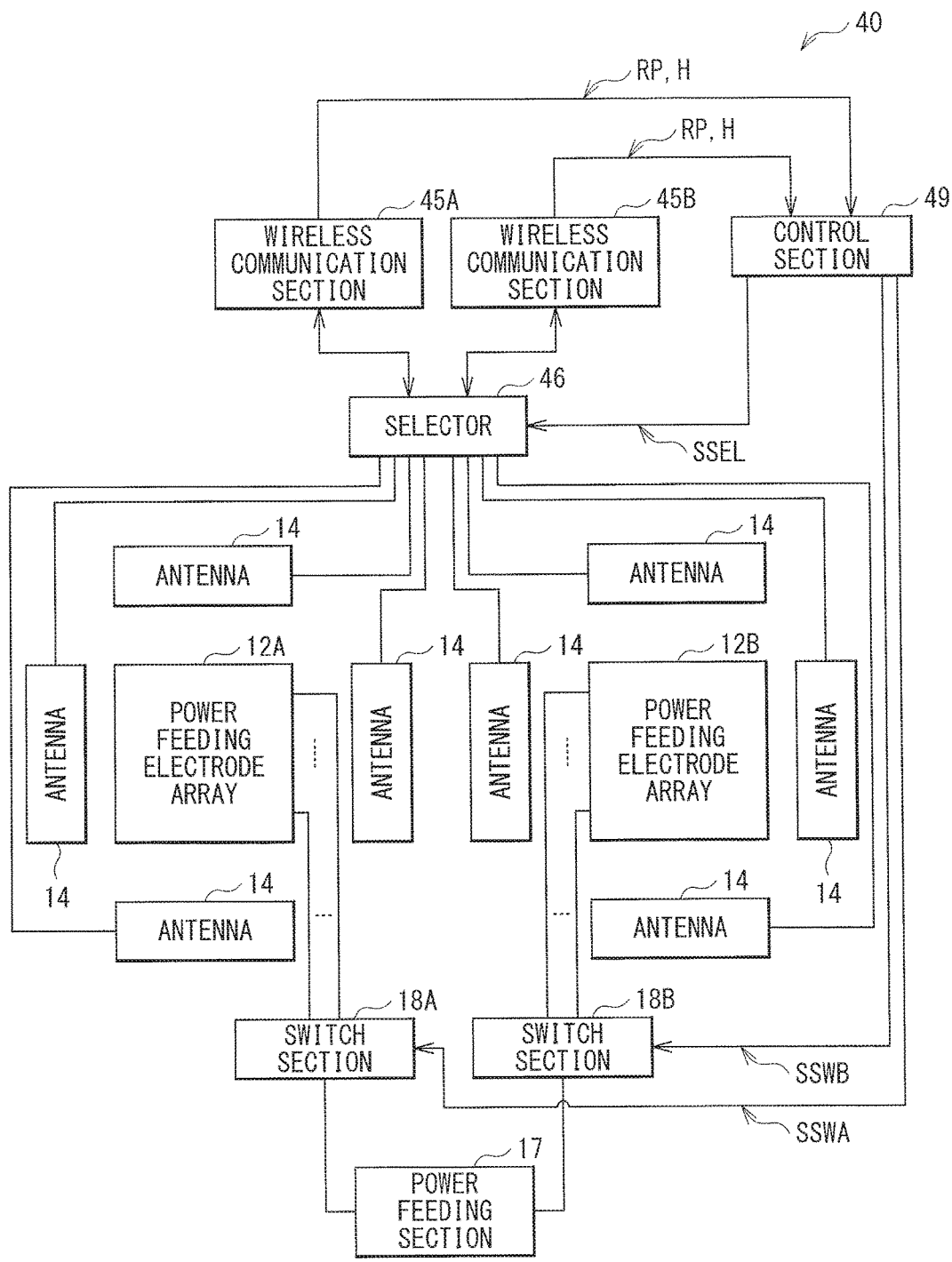
FIG. 17 is a block diagram illustrating an exemplary configuration of a power feeding unit illustrated in FIG. 16.

FIG. 17 illustrates an exemplary configuration of the power feeding unit 40. The power feeding unit 40 includes a selector 46, the wireless communication sections 45A and 45B, and a control section 49.

The selector 46 sequentially selects two antennas 14 of the eight antennas 14 based on the selector control signal SSEL, and connects a first antenna 14 to the wireless communication section 45A while connecting a second antenna 14 to the wireless communication section 45B.

The wireless communication sections 45A and 45B use the antennas 14 different from each other selected by the selector 46 to perform wireless communication with each other, thereby each acquire field intensity RP and a transfer function H. The wireless communication sections 45A and 45B each supply the acquired field intensity RP and transfer function H to the control section 49.

As with the control section 19 according to the first embodiment, the control section 49 controls the selector 46 via the selector control signal SSEL to acquire the field intensity RP and the transfer function H from each of the wireless communication sections 45A and 45B, and controls each of the switch sections 18A and 18B via the switch control signals SSWA and SSWB based on the field intensity RP and the transfer function H.

Figure 18:
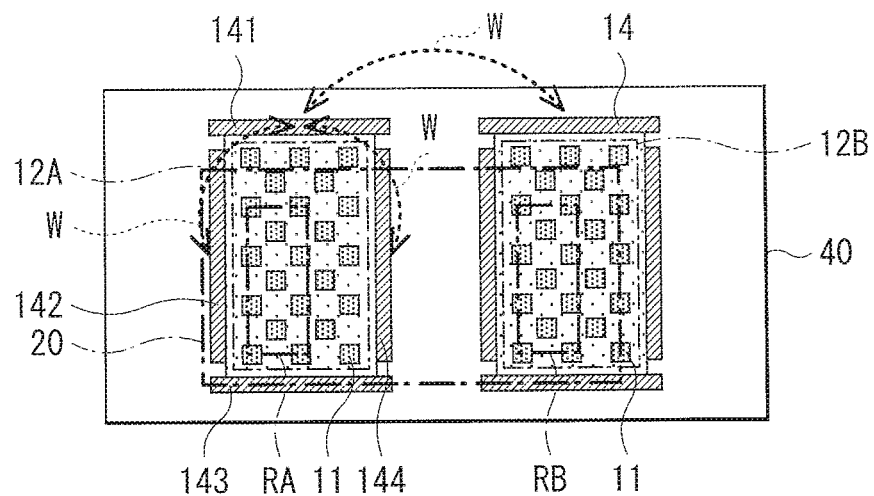
FIG. 18 is an explanatory diagram for explaining an exemplary operation of the power feeding system illustrated in FIG. 16.

FIG. 18 illustrates operation of determining the power feeding electrodes 11. The wireless communication sections 45A and 45B perform wireless communication with each other using antennas 14 different from each other among the eight antennas 14. Specifically, for example, the wireless communication section 45A connected to the antenna 141 and the wireless communication section 45B connected to the antenna 142 may perform wireless communication with each other. For example, the wireless communication section 45A connected to the antenna 141 and the wireless communication section 45B connected to the antenna 144 may perform wireless communication with each other. For example, the wireless communication section 45A connected to the antenna 141 and the wireless communication section 45B connected to one of the antennas 14 disposed in the periphery of the power feeding electrode array 12B may perform wireless communication with each other. In this way, the wireless communication sections 45A and 45B perform wireless communication with each other using two antennas 14 in various combinations.

In the wireless communication between the wireless communication sections 45A and 45B in such a case, the electromagnetic wave is interrupted by the mobile battery 20 at a condition different from others. Consequently, the field intensity RP has a value different from others depending on combinations of the antennas 14 used for wireless communication among the antennas 141 to 144. Similarly, amplitude and a phase of each matrix component of the transfer function H are also varied depending on a placed position of the mobile battery 20.

The control section 49 determines a place, at which the power receiving electrode 21A is disposed, within a region of the power feeding electrode array 12A based on the field intensity RP and the transfer function H. The control section 49 determines power feeding electrodes 11 in the region RA, in which the power receiving electrode 21A is determined to be disposed, as the power feeding electrodes 11 to be used for power feeding among the power feeding electrodes 11 in the power feeding electrode array 12A.

In this way, in the power feeding unit 40, the two wireless communication sections 45A and 45B perform wireless communication with each other. The power feeding unit 40 is therefore allowed to operate even in a circumstance without the access point 100 unlike in the case of the first embodiment, and therefore user convenience is improved.

As described above, in the third embodiment, since the two wireless communication sections perform wireless communication with each other, user convenience is improved. Other effects are similar to those in the case of the first embodiment.

[Modification 3-1]

Any of the Modifications of the first and second embodiments may be appropriately applied to the power feeding system 3 according to the third embodiment.

<4. Fourth Embodiment>

A power feeding system 4 according to a fourth embodiment is now described. The fourth embodiment is configured such that a power feeding unit has two wireless communication sections that perform wireless communication with each other using power feeding electrodes 11 different from each other as antennas. It is to be noted that substantially the same components as those of the power feeding system 3 according to the third embodiment are designated by the same numerals, and description of them is appropriately omitted.

Figure 19:
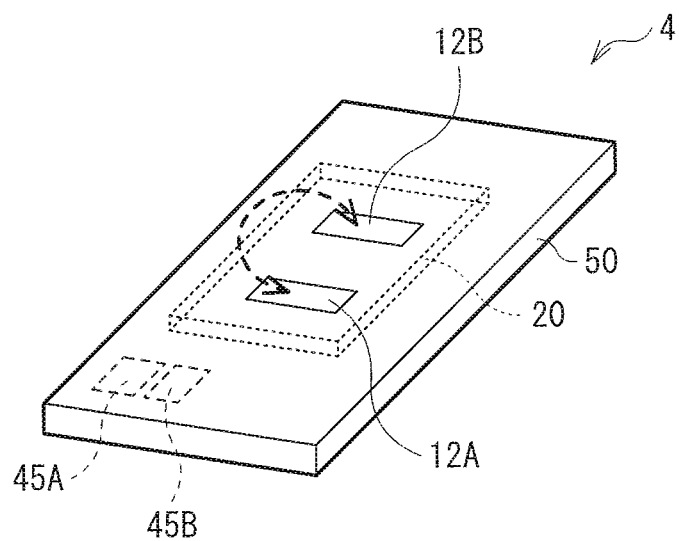
FIG. 19 is an explanatory diagram illustrating an exemplary configuration of a power feeding system according to a fourth embodiment.

FIG. 19 illustrates an exemplary configuration of a power feeding system 4 according to the fourth embodiment. The power feeding system 4 includes a power feeding unit 50. In the power feeding unit 50, two wireless communication sections 45A and 45B perform wireless communication with each other using power feeding electrodes 11 different from each other. Specifically, although the wireless communication sections 45A and 45B according to the third embodiment perform wireless communication with each other using the antennas 14, the wireless communication sections 45A and 45B according to the fourth embodiment perform wireless communication using the power feeding electrodes 11 as antennas.

Figure 20:
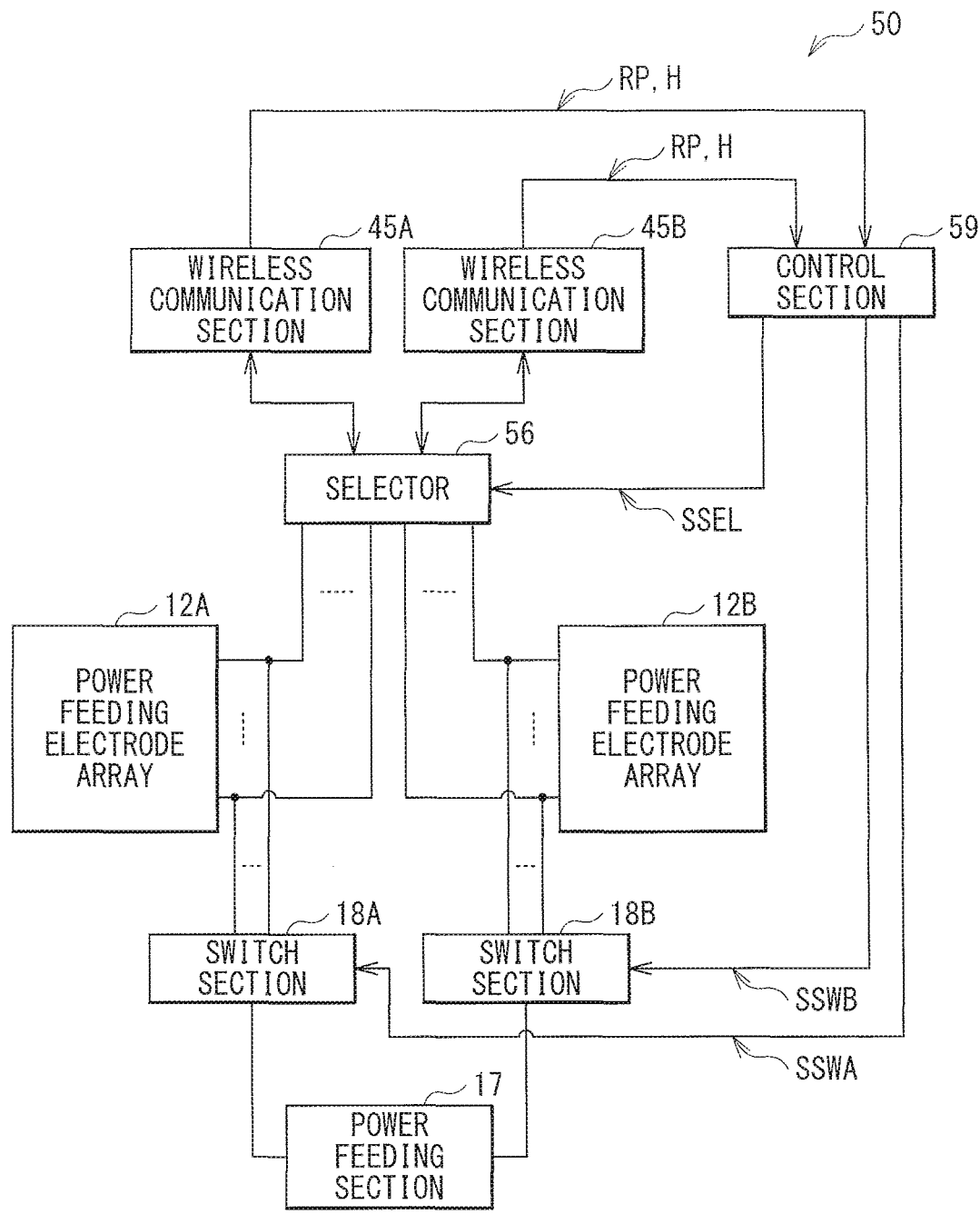
FIG. 20 is a block diagram illustrating an exemplary configuration of a power feeding unit illustrated in FIG. 19.

FIG. 20 illustrates an exemplary configuration of the power feeding unit 50. The power feeding unit 50 includes a selector 56 and a control section 59.

The selector 56 sequentially selects two power feeding electrodes 11 among a plurality of power feeding electrodes 11 in the power feeding electrode arrays 12A and 12B based on the selector control signal SSEL, and connects a first power feeding electrode 11 to the wireless communication section 45A while connecting a second power feeding electrode 11 to the wireless communication section 45B. The wireless communication sections 45A and 45B perform wireless communication with each other using the respective different power feeding electrodes 11 selected by the selector 56 as antennas, thereby each acquire field intensity RP and a transfer function H and supply the field intensity RP and the transfer function H to the control section 19.

As with the control section 49 according to the third embodiment, the control section 59 controls the selector 56 via the selector control signal SSEL to acquire the field intensity RP and the transfer function H from each of the wireless communication sections 45A and 45B, and controls each of the switch sections 18A and 18B via the switch control signals SSWA and SSWB based on the field intensity RP and the transfer function H.

Figure 21:
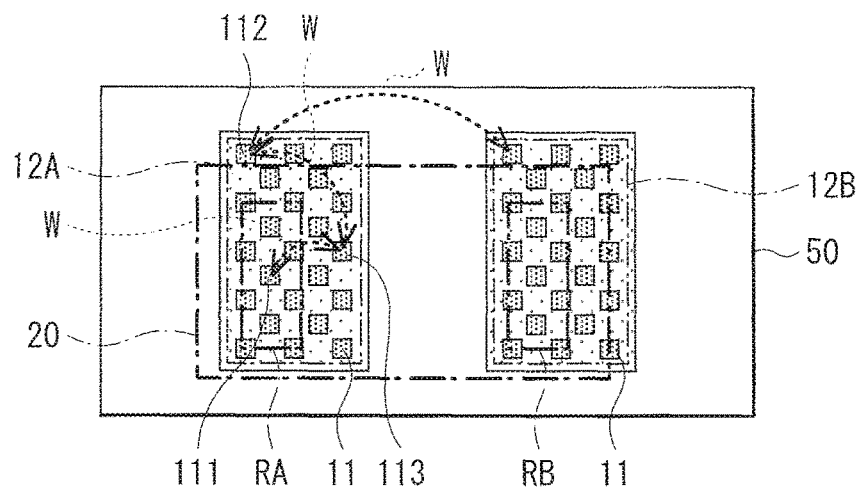
FIG. 21 is an explanatory diagram for explaining an exemplary operation of the power feeding system illustrated in FIG. 19.

FIG. 21 illustrates operation of determining the power feeding electrodes 11. The wireless communication sections 45A and 45B use the power feeding electrodes 11 different from each other as antennas among the plurality of power feeding electrodes 11 in the power feeding electrode arrays 12A and 12B to perform wireless communication with each other. Specifically, for example, the wireless communication section 45A connected to a power feeding electrode 11 (for example, a power feeding electrode 111) located under the mobile battery 20 and the wireless communication section 45B connected to another power feeding electrode 11 (for example, a power feeding electrode 113) located under the mobile battery 20 may perform wireless communication with each other. For example, the wireless communication section 45A connected to a power feeding electrode 11 (for example, a power feeding electrode 112) that is not located under the mobile battery 20 and the wireless communication section 45B connected to a power feeding electrode 11 (for example, the power feeding electrode 113) located under the mobile battery 20 may perform wireless communication with each other. For example, the wireless communication section 45A connected to a power feeding electrode 11 (for example, a power feeding electrode 112) that is not located under the mobile battery 20 and the wireless communication section 45B connected to one of the power feeding electrodes 11 in the power feeding electrode array 12B may perform wireless communication with each other. In this way, the wireless communication sections 45A and 45B perform wireless communication with each other using, as antennas, two power feeding electrodes 11 in any of various combinations.

In such operation, field intensity RP is lower in the case of wireless communication using the power feeding electrodes 111 and 113 than in the case of wireless communication using the power feeding electrodes 112 and 113. Specifically, while the power feeding electrodes 111 and 113 are located under the mobile battery 20, the power feeding electrode 112 is not located under the mobile battery 20. Consequently, an electromagnetic wave is more easily interrupted by the mobile battery 20 and therefore field intensity RP is lower in wireless communication using the power feeding electrodes 111 and 113 than in wireless communication using the power feeding electrodes 112 and 113. Similarly, a transfer function H concerning the wireless communication between the power feeding electrodes 111 and 113 has a smaller amplitude component than a transfer function H concerning the wireless communication between the power feeding electrodes 112 and 113.

The control section 59 determines a place, at which the power receiving electrode 21A is disposed, within a region of the power feeding electrode array 12A based on the field intensity RP and the transfer function H. The control section 59 determines power feeding electrodes 11 in the region RA, in which the power receiving electrode 21A is determined to be disposed, as the power feeding electrodes 11 to be used for power feeding among the power feeding electrodes 11 in the power feeding electrode array 12A.

In this way, in the power feeding unit 50, the two wireless communication sections 45A and 45B perform wireless communication with each other using the power feeding electrodes 11 different from each other as antennas. Consequently, the antennas 14 used in the third embodiment are allowed to be omitted; hence, it is possible to reduce component cost and make appearance to be simpler. Moreover, since the power feeding electrodes 11 that perform power feeding are also used as antennas for wireless communication, it is possible to highly accurately determine the power feeding electrodes 11 opposed to the power receiving electrodes 21A and 21B, and therefore possible to perform power feeding control more finely.

As described above, in the fourth embodiment, the wireless communication section performs wireless communication using the power feeding electrodes as antennas; hence, it is possible to reduce component cost and make appearance to be simpler.

In the fourth embodiment, since the power feeding electrodes that perform power feeding are also used as antennas for wireless communication, it is possible to highly accurately determine the power feeding electrodes opposed to the power receiving electrodes and perform power feeding control more finely.

Other effects are similar to those in the case of the third embodiment.

[Modification 4-1]

Any of the Modifications of the first to third embodiments may be appropriately applied to the power feeding system 4 according to the fourth embodiment.

<5. Fifth Embodiment>

A power feeding system 5 according to a fifth embodiment is now described. The fifth embodiment is configured such that a wireless communication section is provided on a mobile battery side, and the wireless communication section performs wireless communication with the access point 100 using power receiving electrodes as antennas. It is to be noted that substantially the same components as those of the power feeding system 1 and the like according to the first embodiment and the like are designated by the same numerals, and description of them is appropriately omitted.

Figure 22:
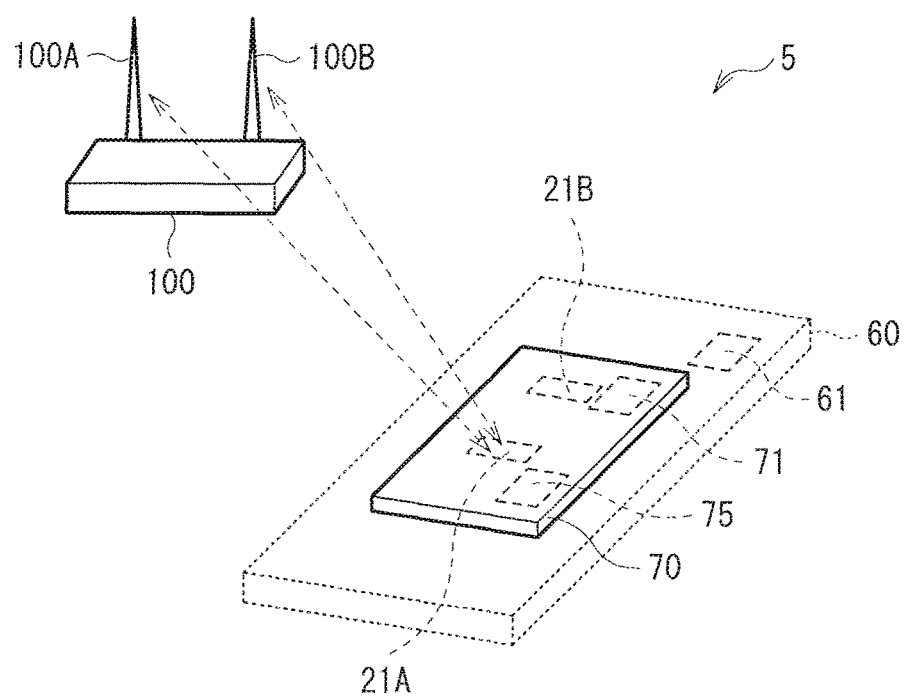
FIG. 22 is an explanatory diagram illustrating an exemplary configuration of a power feeding system according to a fifth embodiment.

FIG. 22 illustrates an exemplary configuration of a power feeding system 5 according to the fifth embodiment. The power feeding system 5 includes a mobile battery 70 and a power feeding unit 60. The mobile battery 70 has a wireless communication section 75 (described later) that performs wireless communication with the access point 100 using the power receiving electrodes 21A and 21B as antennas. Specifically, although the wireless communication section 15 of the power feeding unit 10 performs wireless communication with the access point 100 in the power feeding system 1 according to the first embodiment, the wireless communication section 75 of the mobile battery 70 performs wireless communication with the access point 100 in the power feeding system 5 according to the fifth embodiment. The mobile battery 70 transmits field intensity RP and a transfer function H acquired by the wireless communication section 75 to a power feeding unit 60 via a communication section 71 (described later).

Figure 23:
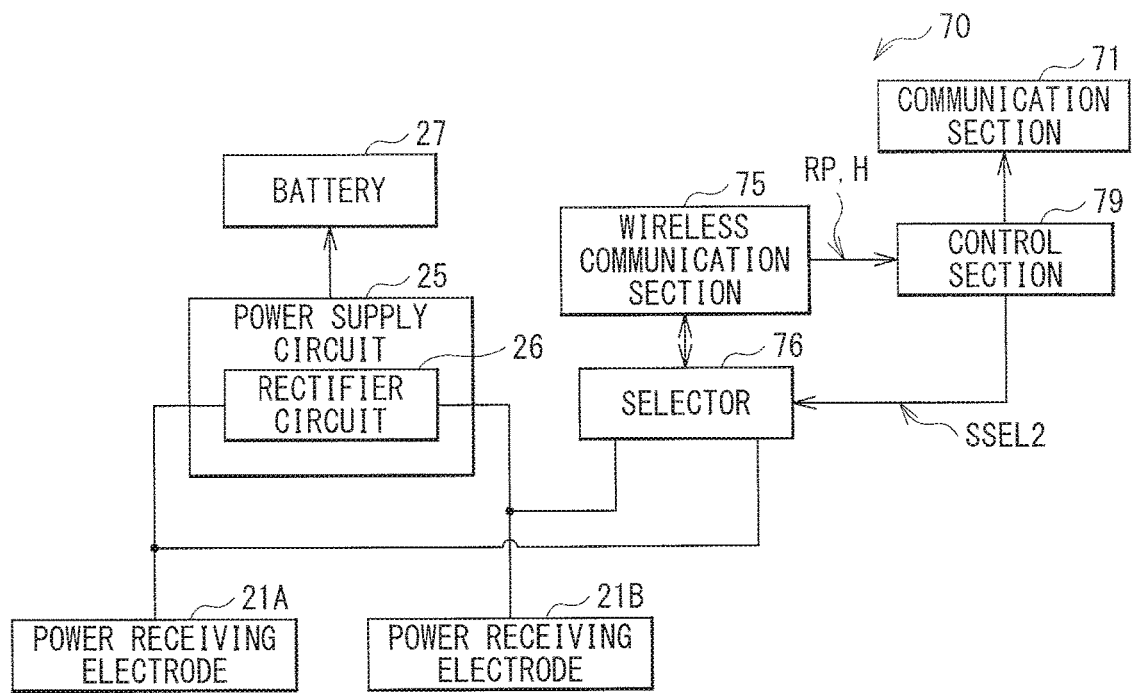
FIG. 23 is a block diagram illustrating an exemplary configuration of a mobile battery illustrated in FIG. 22.

FIG. 23 illustrates an exemplary configuration of the mobile battery 70. The mobile battery 70 includes a selector 76, a wireless communication section 75, a control section 79, and a communication section 71.

The selector 76 sequentially selects one of the power receiving electrodes 21A and 21B based on a selector control signal SSEL2, and connects the selected power receiving electrode to the wireless communication section 75.

The wireless communication section 75 performs wireless communication with the access point 100 using, as an antenna, the power receiving electrode selected by the selector 76 between the power receiving electrodes 21A and 21B, and acquires field intensity RP and a transfer function H. The wireless communication section 75 then supplies the field intensity RP and the transfer function H to the control section 79.

The control section 79 controls the selector 76 via the selector control signal SSEL to acquire the field intensity RP and the transfer function H from the wireless communication section 75, and supplies the field intensity RP and the transfer function H to the communication section 71.

The communication section 71 supplies the field intensity RP and the transfer function H supplied from the control section 79 to a communication section 61 (described later) of the power feeding unit 60. As a communication method, for example, wired or wireless communication may be used. In the case of using wired communication, for example, universal serial bus (USB) (registered trademark) may be used. In the case of using wireless communication, for example, near field communication (NFC) such as FeliCa (registered trademark) and TransferJet (registered trademark) may be used. In the case of using such wireless techniques, the power receiving electrodes 21A and 21B may be used as antennas.

Figure 24:
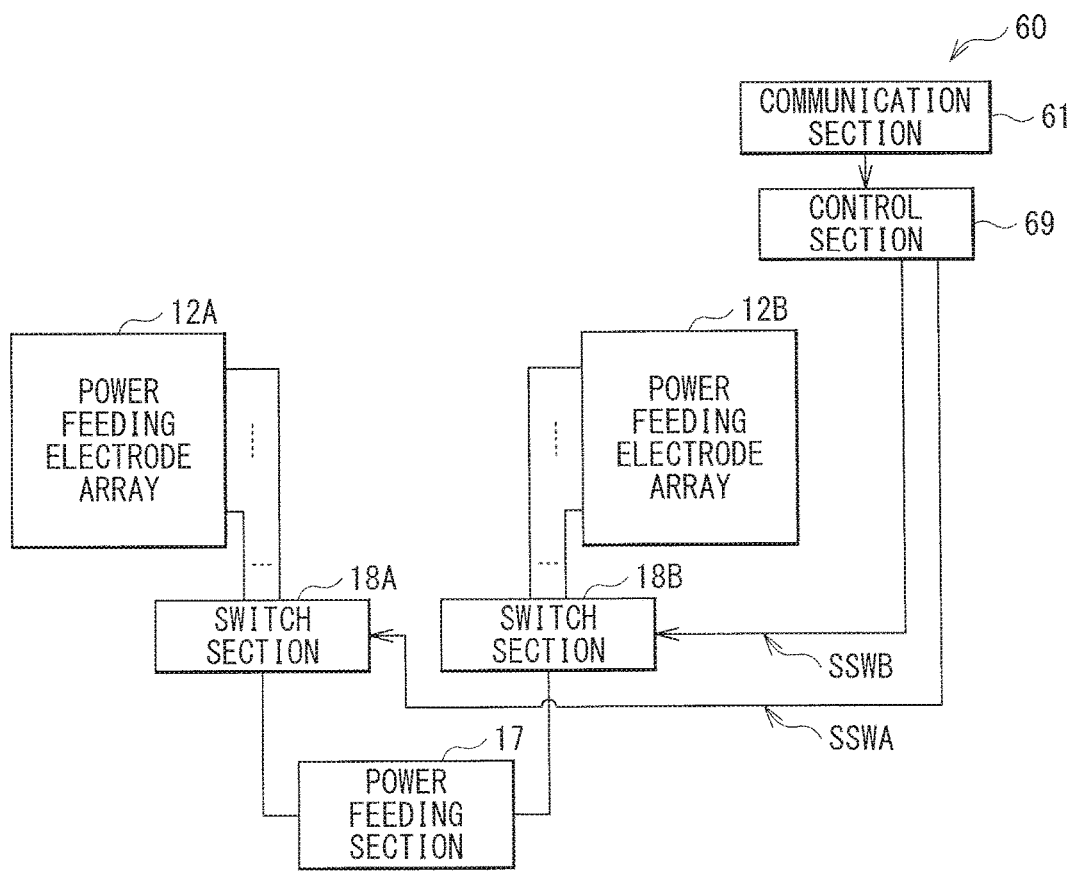
FIG. 24 is a block diagram illustrating an exemplary configuration of the power feeding unit illustrated in FIG. 22.

FIG. 24 illustrates an exemplary configuration of the power feeding unit 60. The power feeding unit 60 includes a communication section 61 and a control section 69. The communication section 61 performs communication with the communication section 71 of the mobile battery 70 to receive the field intensity RP and the transfer function H, and supplies the field intensity RP and the transfer function H to the control section 69. The control section 69 controls the switch sections 18A and 18B via the switch control signals SSWA and SSWB based on the supplied field intensity RP and transfer function H.

As described above, in the fifth embodiment, the wireless communication section is provided on the mobile battery side, and the wireless communication section performs wireless communication with the access point using the power feeding electrodes as antennas. According to such a configuration, it is also possible to obtain effects similar to those of the first embodiment and the like.

[Modification 5-1]

Any of the Modifications of the first to fourth embodiments may be appropriately applied to the power feeding system 5 according to the fifth embodiment.

<6. Sixth Embodiment>

A power feeding system 6 according to a sixth embodiment is now described. The sixth embodiment is configured such that a power feeding unit beforehand performs power feeding (pre-power feeding) to the mobile battery 20 using power feeding electrodes 11 in the power feeding electrode arrays 12A and 12B, and determines power feeding electrodes 11 to be used for main power feeding based on a detection value detected by an antenna during the pre-power feeding. It is to be noted that substantially the same components as those of the power feeding system 1 and the like according to the first embodiment and the like are designated by the same numerals, and description of them is appropriately omitted.

Figure 25:
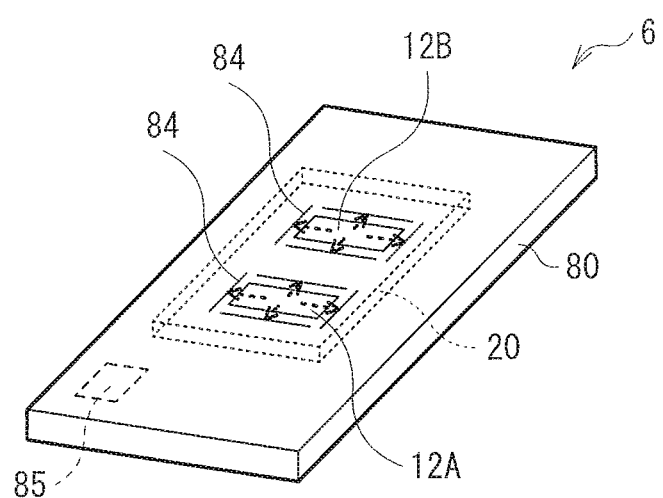
FIG. 25 is an explanatory diagram illustrating an exemplary configuration of a power feeding system according to a sixth embodiment.

FIG. 25 illustrates an exemplary configuration of a power feeding system 6 according to the sixth embodiment. The power feeding system 6 includes a power feeding unit 80. The power feeding unit 80 sequentially selects one of the power feeding electrodes 11 in the power feeding electrode arrays 12A and 12B to perform pre-power feeding before performing main power feeding to the mobile battery 20. During the pre-power feeding, in the power feeding unit 80, an antenna 84 (described later) and a detection section 85 (described later) detect a harmonic component of a radiation electromagnetic field emitted from each power feeding electrode 11, and determines power feeding electrodes 11 to be used for main power feeding based on the detection result DET.

Figure 26:
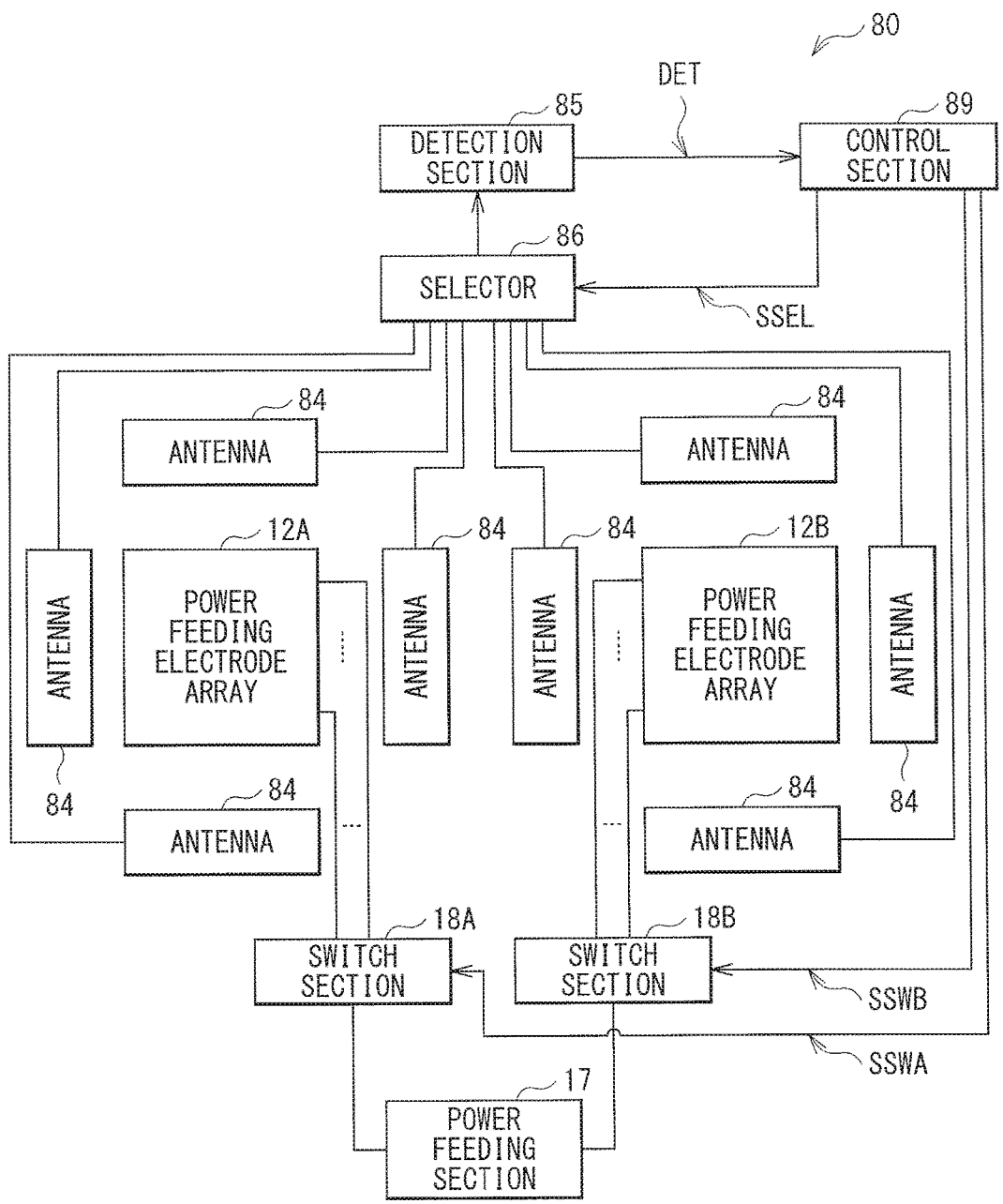
FIG. 26 is a block diagram illustrating an exemplary configuration of a power feeding unit illustrated in FIG. 25.

FIG. 26 illustrates an exemplary configuration of the power feeding unit 80. The power feeding unit 80 includes eight antennas 84, a selector 86, a detection section 85, and a control section 89.

Each antenna 84 is a sensor that detects the harmonic component of the radiation electromagnetic field emitted from each power feeding electrode 11 while the power feeding unit 80 sequentially selects one of the power feeding electrodes 11 in the power feeding electrode arrays 12A and 12B to perform the pre-power feeding to the mobile battery 20, and includes, for example, a magnetic field probe or a micro-loop antenna. In this exemplary case, four of the eight antennas 84 are disposed so as to enclose the power feeding electrode array 12A, while the remaining four antennas 84 are disposed so as to enclose the power feeding electrode array 12B.

During the pre-power feeding, the selector 86 sequentially selects one of the eight antennas 84 based on the selector control signal SSEL, and connects the selected antenna 84 to the detection section 85.

During the pre-power feeding, the detection section 85 detects the harmonic component of the radiation electromagnetic field based on the detection signal output from the antenna 84 selected by the selector 86.

The control section 89 controls the switch sections 18A and 18B via the switch control signals SSWA and SSWB to sequentially connect one of the power feeding electrodes 11 in the power feeding electrode array 12A to a first end of the power feeding section 17, and sequentially connect one of the power feeding electrodes 11 in the power feeding electrode array 12B to a second end of the power feeding section 17, and thus performs pre-power feeding to the mobile battery 20. During this operation, the control section 89 controls the selector 86 via the selector control signal SSEL to sequentially connect the eight antennas 84 to the detection section 85, and acquires the detection result DET of the harmonic component of the radiation electromagnetic field from the detection section 85. As described later, the harmonic component varies in accordance with a relative positional relationship between the power feeding unit 80 and the mobile battery 20 on the power feeding unit 80. The control section 89 determines power feeding electrodes 11 to be used for main power feeding among the power feeding electrodes 11 in the power feeding electrode arrays 12A and 12B based on the detection result DET.

The antenna 84 corresponds to a specific but not limitative example of "electromagnetic field sensor" in one embodiment of the disclosure.

Figure 27:
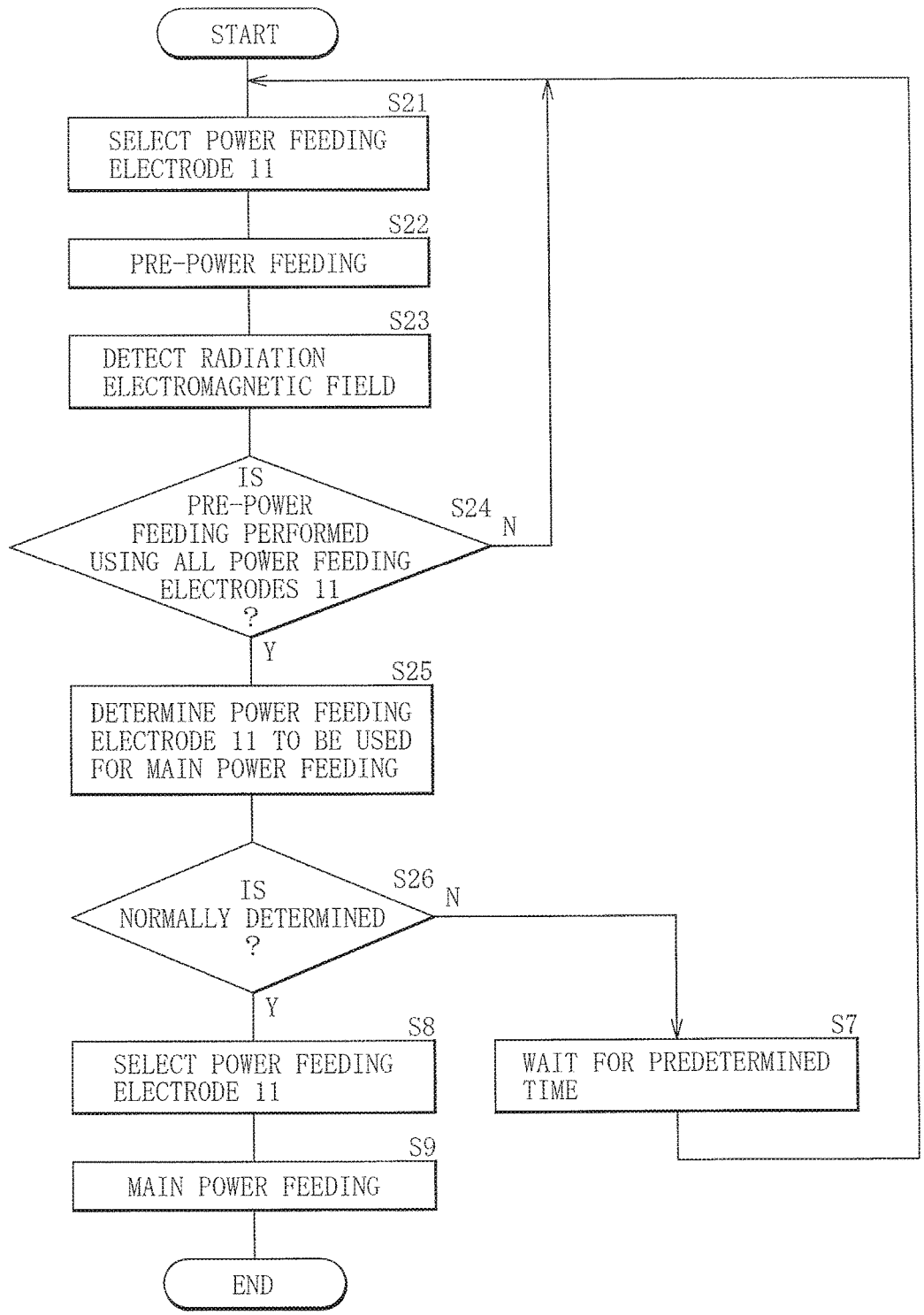
FIG. 27 is a flowchart illustrating an exemplary operation of the power feeding system illustrated in FIG. 25.

FIG. 27 is a flowchart illustrating an exemplary operation of the power feeding system 6.

First, the control section 89 controls the switch sections 18A and 18B via the switch control signals SSWA and SSWB to connect one of the power feeding electrodes 11 in the power feeding electrode array 12A to the first end of the power feeding section 17, and connect one of the power feeding electrodes 11 in the power feeding electrode array 12B to a second end of the power feeding section 17 (step S21).

Subsequently, the power feeding section 17 performs pre-power feeding to the mobile battery 20 (step S22).

Subsequently, the detection section 85 detects the harmonic component of the radiation electromagnetic field (step S23). Specifically, the control section 89 controls the selector 86 via the selector control signal SSEL to sequentially connect the detection section 85 to one of the eight antennas 84. The detection section 85 detects the harmonic component of the radiation electromagnetic field based on the detection signal supplied from that antenna 84, and supplies the detection result DET to the control section 89.

Subsequently, the control section 89 checks whether or not the pre-power feeding is performed using all the power feeding electrodes 11 in the power feeding electrode arrays 12A and 12B (step S24). When the pre-power feeding is performed using all the power feeding electrodes 11, the process is advanced to step S25. When the pre-power feeding is not performed using all the power feeding electrodes 11, the process is returned to step S21, and the control section 89 selects another power feeding electrode 11. In this way, steps S21 to S24 are repeated until the pre-power feeding is performed using all the power feeding electrodes 11.

When the control section 89 confirms that the pre-power feeding is performed using all the power feeding electrodes 11 in step S24, the control section 89 determines power feeding electrodes 11 to be used for main power feeding based on the detection result DET of the harmonic component of the radiation electromagnetic field acquired in steps S21 to S24 (step S25). Specifically, since the harmonic component varies in accordance with a relative positional relationship between the power feeding unit 80 and the mobile battery 20 on the power feeding unit 80 as described below, the control section 89 grasps the positional relationship based on the detection result DET of the harmonic component, and determines the power feeding electrodes 11 to be used for main power feeding.

Figure 28:
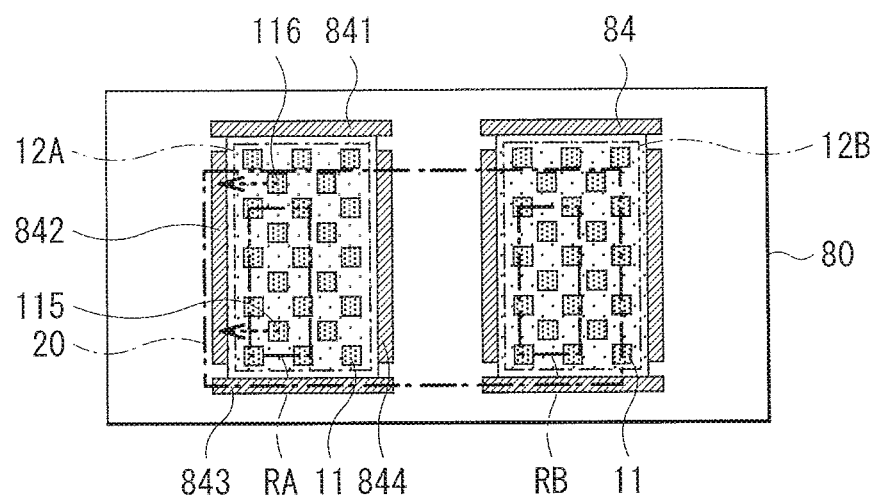
FIG. 28 is an explanatory diagram for explaining an exemplary operation of the power feeding system illustrated in FIG. 25.

FIG. 28 illustrates operation of determining the power feeding electrodes 11. Hereinafter, for convenience of description, among the four antennas 84 disposed in the periphery of the power feeding electrode array 12A, an antenna disposed on an upper side of the power feeding electrode array 12A is denoted as antenna 841, an antenna disposed on a left side of the power feeding electrode array 12A is denoted as antenna 842, an antenna disposed on a lower side of the power feeding electrode array 12A is denoted as antenna 843, and an antenna disposed on a right side of the power feeding electrode array 12A is denoted as antenna 844. In this exemplary case, a region RA corresponding to the power receiving electrode 21A is located at the lower left in a region of the power feeding electrode array 12A. Similarly, a region RB corresponding to the power receiving electrode 21B is located at the lower left in a region of the power feeding electrode array 12B. In this case, for example, when pre-power feeding is performed using a power feeding electrode 11 (for example, a power feeding electrode 115) opposed to the power receiving electrode 21A among the power feeding electrodes 11 in the power feeding electrode array 12A, a harmonic component of a radiation electromagnetic field detected by the antenna 842 has a higher intensity than a harmonic component of a radiation electromagnetic field detected by the antenna 842 when pre-power feeding is performed using a power feeding electrode 11 (for example, a power feeding electrode 116) that is not opposed to the power receiving electrode 21A. This is because when pre-power feeding is performed using the power feeding electrode 11 (for example, the power feeding electrode 115) opposed to the power receiving electrode 21A, a displacement current is generated between the power feeding electrodes 115 and the power receiving electrode 21A, and a harmonic component of the displacement current is emitted as an electromagnetic wave to a distance.

The control section 89 determines a place, at which the power receiving electrode 21A is disposed, within a region of the power feeding electrode array 12A based on the detection result DET of the harmonic component of the radiation electromagnetic field. The control section 89 then determines power feeding electrodes 11 in the region RA, in which the power receiving electrode 21A is determined to be disposed, as the power feeding electrodes 11 to be used for main power feeding among the power feeding electrodes 11 in the power feeding electrode array 12A.

Subsequently, the control section 89 determines whether or not the power feeding electrodes 11 to be used for main power feeding are normally determined, as in step S6 in the first embodiment (step S26). When the control section 89 determines that the power feeding electrodes 11 to be used for main power feeding are not allowed to be normally determined, the process is advanced to step S7, and steps S21 to S26 are repeated again after waiting for a predetermined time. When the control section 89 determines that the power feeding electrodes 11 to be used for power feeding are normally determined, the control section 89 selects power feeding electrodes 11 (step S8), performs main power feeding to the mobile battery 20 (step S9), and finishes the flow, as in the case of the first embodiment.

In this way, in the power feeding system 6, pre-power feeding is performed every power feeding electrode 11 before main power feeding, and the power feeding electrodes 11 to be used for main power feeding are determined based on the harmonic component of the radiation electromagnetic field formed during the pre-power feeding. Consequently, in the power feeding system 6, since the power feeding unit or the mobile battery is not necessary to have a wireless communication section unlike in the case of each of the first to fifth embodiments, a simple configuration is achieved.

Moreover, in the power feeding system 6, since the harmonic component (a high-frequency electromagnetic field) of the radiation electromagnetic field is used, the electromagnetic wave is emitted to a more distant point than in the case of using a fundamental wave component of the radiation electromagnetic field. It is therefore possible to improve detection sensibility and increase a degree of freedom of layout of the antennas 81 to 84 and the like. Consequently, since the power feeding electrodes 11 opposed to the power receiving electrodes 21A and 21B are allowed to be accurately determined, it is possible to perform power feeding control more finely.

Although the harmonic component of the radiation electromagnetic field is used in this exemplary case, this is not limitative. For example, in the case where the antennas 81 to 84 are allowed to be disposed close to the power feeding electrode arrays 12A and 12B, an electromagnetic field of a fundamental wave component may be detected in place of the harmonic component.

As described above, in the sixth embodiment, since the power feeding electrodes to be used for main power feeding are determined based on the harmonic component of the radiation electromagnetic field formed by pre-power feeding, a simple configuration is achieved.

In the sixth embodiment, since the harmonic component is used, it is possible to improve detection sensibility and perform power feeding control more finely.

Other effects are similar to those in the case of the first embodiment, etc.

[Modification 6-1]

Although the detection section 85 detects the harmonic component of the radiation electromagnetic field formed by pre-power feeding before main power feeding in the sixth embodiment, this is not limitative. For example, the harmonic component of the radiation electromagnetic field may be detected during main power feeding. Modification 6-1 is now described in detail.

Figure 29:
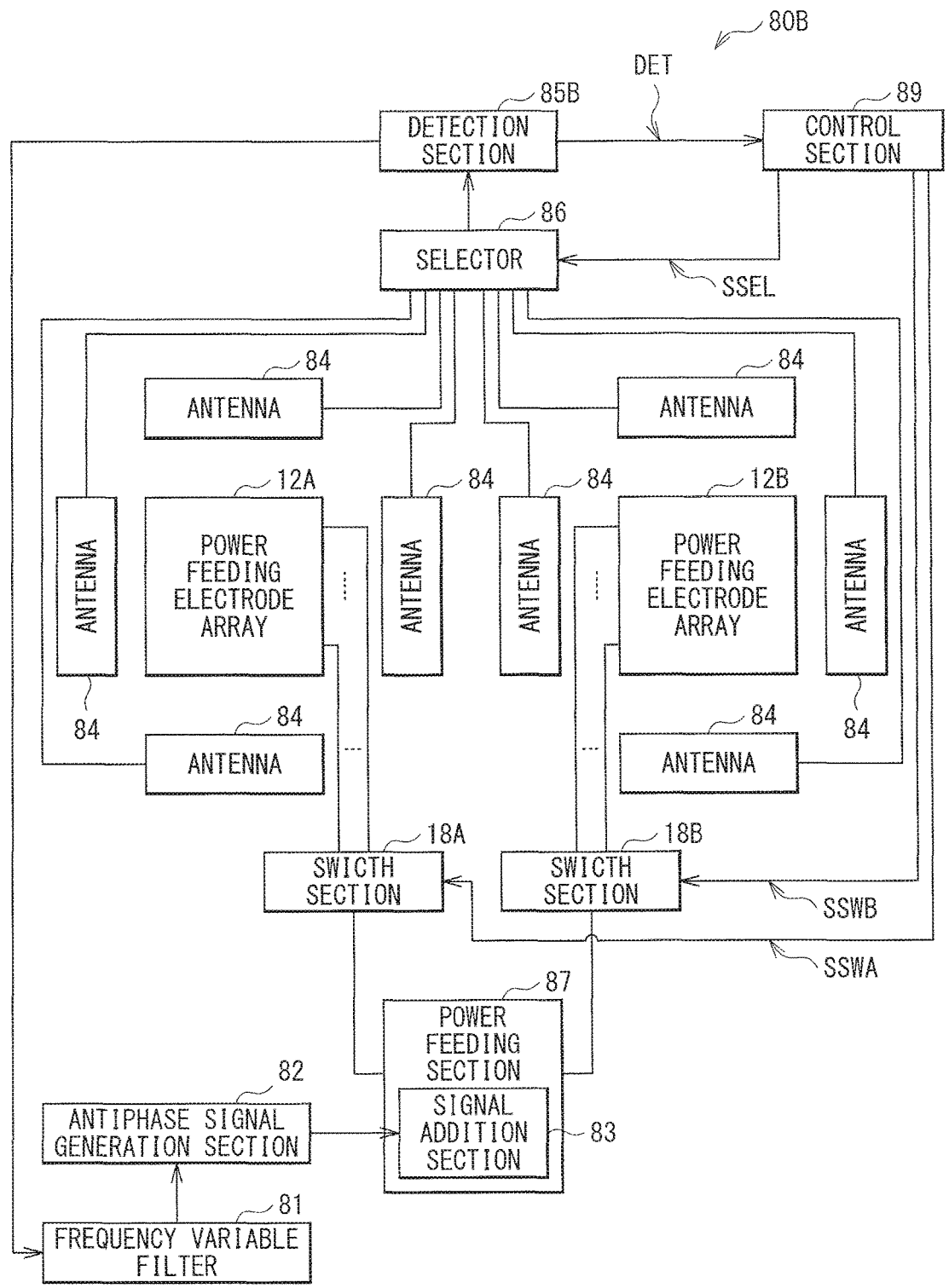
FIG. 29 is a block diagram illustrating an exemplary configuration of a power feeding unit according to a modification of the six embodiment.

FIG. 29 illustrates an exemplary configuration of a power feeding unit 80B according to the Modification 6-1. The power feeding unit 80B includes the detection section 85B, a frequency variable filter 81, an antiphase signal generation section 82, and a power feeding section 87. The detection section 85B operates in the same way as the detection section 85 according to the sixth embodiment before main power feeding, and supplies a detection signal supplied from each antenna 84 to the frequency variable filter 81. The frequency variable filter 81 is a bandpass filter that allows passing of a signal in a special frequency range in the detection signal supplied from the detection section 85B. For example, the frequency variable filter 81 may be set so as to allow passing of the strongest harmonic component. The antiphase signal generation section 82 generates a signal having a phase opposite to a phase of an output signal of the frequency variable filter 81. The power feeding section 87 includes a signal addition section 83. The signal addition section 83 adds an output signal of the antiphase signal generation section 82 to an AC power signal. The power feeding section 87 outputs the added signal as a power signal SP.

Consequently, in the power feeding unit 80B, it is possible to suppress the harmonic component of the radiation electromagnetic field during main power feeding. Hence, it is possible to reduce a possibility of influence of the harmonic component of the radiation electromagnetic field on a human, and improve safety during power feeding.

[Modification 6-2]

Any of the Modifications of the first to fifth embodiments may be appropriately applied to the power feeding system 6 according to the sixth embodiment.

<7. Seventh Embodiment>

A power feeding system 7 according to a seventh embodiment is now described. The seventh embodiment is configured such that a power feeding unit performs pre-power feeding using each of the power feeding electrodes 11 in the power feeding electrode arrays 12A and 12B, and determines power feeding electrodes 11 to be used for main power feeding based on whether the pre-power feeding is possible or not. It is to be noted that substantially the same components as those of the power feeding system 1 and the like according to the first embodiment and the like are designated by the same numerals, and description of them is appropriately omitted.

Figure 30:
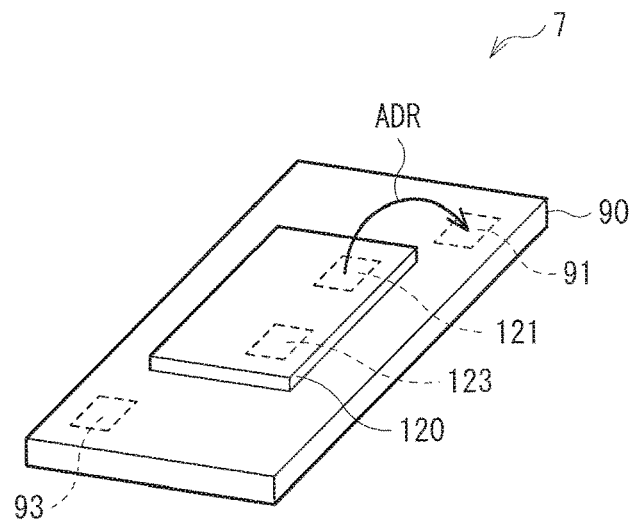
FIG. 30 is an explanatory diagram illustrating an exemplary configuration of a power feeding system according to a seventh embodiment.

FIG. 30 illustrates an exemplary configuration of a power feeding system 7 according to the seventh embodiment. The power feeding system 7 includes a power feeding unit 90 and a mobile battery 120. The power feeding unit 90 sequentially selects one of the power feeding electrodes 11 in the power feeding electrode arrays 12A and 12B to perform the pre-power feeding before performing the main power feeding to the mobile battery 120. During this operation, in the power feeding unit 90, a modulation section 93 (described later) modulates the power signal SP with an address code ADR for identifying the selected power feeding electrode 11 to generate a modulated power signal SP2. In the mobile battery 120, when power given by pre-power feeding is received, a demodulation section 123 (described later) demodulates the power signal SP to acquire an address code ADR, and the address code ADR is supplied to the power feeding unit 90. The power feeding unit 90 determines power feeding electrodes 11 to be used for main power feeding based on the address code ADR.

Figure 31:
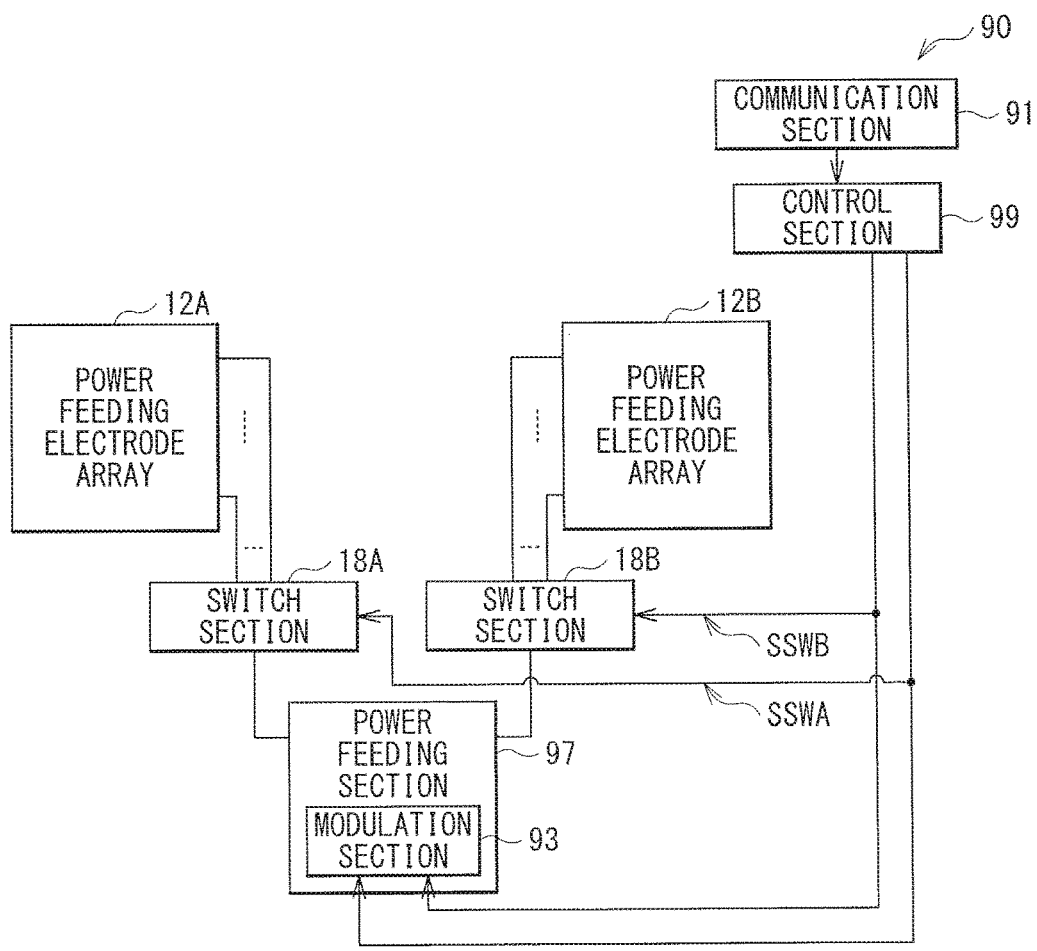
FIG. 31 is a block diagram illustrating an exemplary configuration of a power feeding unit illustrated in FIG. 30.

FIG. 31 illustrates an exemplary configuration of the power feeding unit 90. The power feeding unit 90 includes a power feeding section 97, a communication section 91, and a control section 99.

The power feeding section 97 includes the modulation section 93. During pre-power feeding, based on the switch control signals SSWA and SSWB, the modulation section 93 modulates the power signal SP to generate the modulated power signal SP2 based on an address code ADR for a power feeding electrode 11 selected by the switch section 18A among the power feeding electrodes 11 in the power feeding electrode array 12A, and an address code ADR for a power feeding electrode 11 selected by the switch section 18B among the power feeding electrodes 11 in the power feeding electrode array 12B. The power feeding section 97 supplies the modulated power signal SP2 to the power feeding electrodes 11 via the switch sections 18A and 18B.

During pre-power feeding, the communication section 91 performs communication with a communication section 121 (described later) of the mobile battery 120 to receive the address code ADR, and supplies the address code ADR to the control section 99. As a communication method, for example, wired or wireless communication may be used as in the case of the communication sections 61 and 71 according to the fifth embodiment.

The control section 99 controls the switch sections 18A and 18B via the switch control signals SSWA and SSWB to sequentially connect one of the power feeding electrodes 11 in the power feeding electrode array 12A to a first end of the power feeding section 17, and sequentially connect one of the power feeding electrodes 11 in the power feeding electrode array 12B to a second end of the power feeding section 17, and thus performs pre-power feeding to the mobile battery 20. During this operation, the control section 99 controls the modulation section 93 via the switch control signals SSWA and SSWB to modulate an AC power signal with an address code ADR for the power feeding electrode 11 selected by the switch sections 18A and 18B. The control section 99 determines power feeding electrodes 11 to be used for main power feeding among the power feeding electrodes 11 in the power feeding electrode arrays 12A and 12B based on the address code ADR supplied from the communication section 91.

Figure 32:
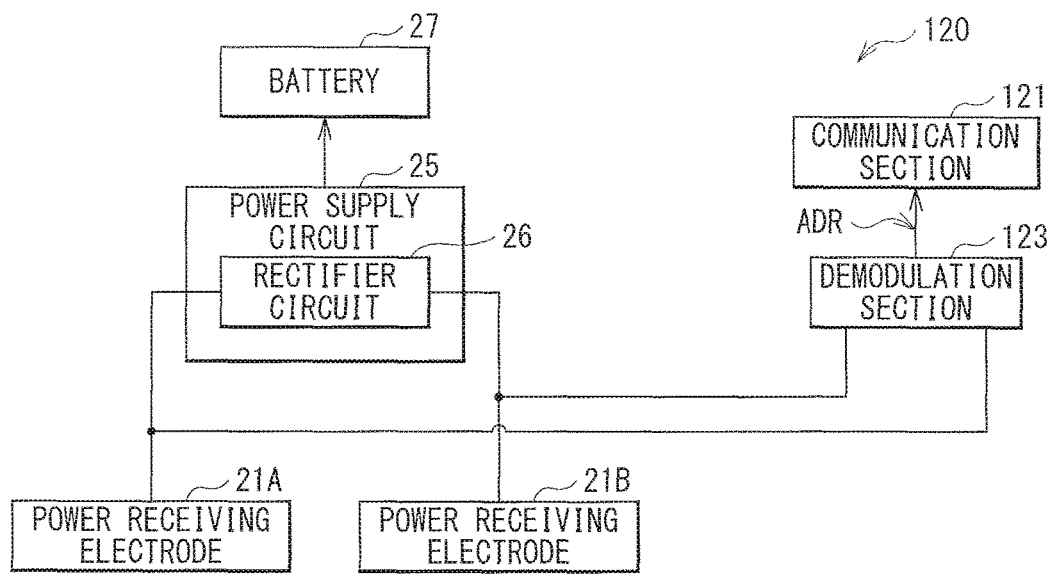
FIG. 32 is a block diagram illustrating an exemplary configuration of a mobile battery illustrated in FIG. 30.

FIG. 32 illustrates an exemplary configuration of the mobile battery 120. The mobile battery 120 includes the demodulation section 123 and the communication section 121.

During pre-power feeding, the demodulation section 123 performs demodulation processing based on a voltage (an AC signal) generated between the power receiving electrodes 21A and 21B to acquire the address code ADR. The demodulation section 123 supplies the address code ADR to the communication section 121.

The communication section 121 supplies the address code ADR supplied from the demodulation section 123 to the communication section 91 of the power feeding unit 90.

Figure 33:
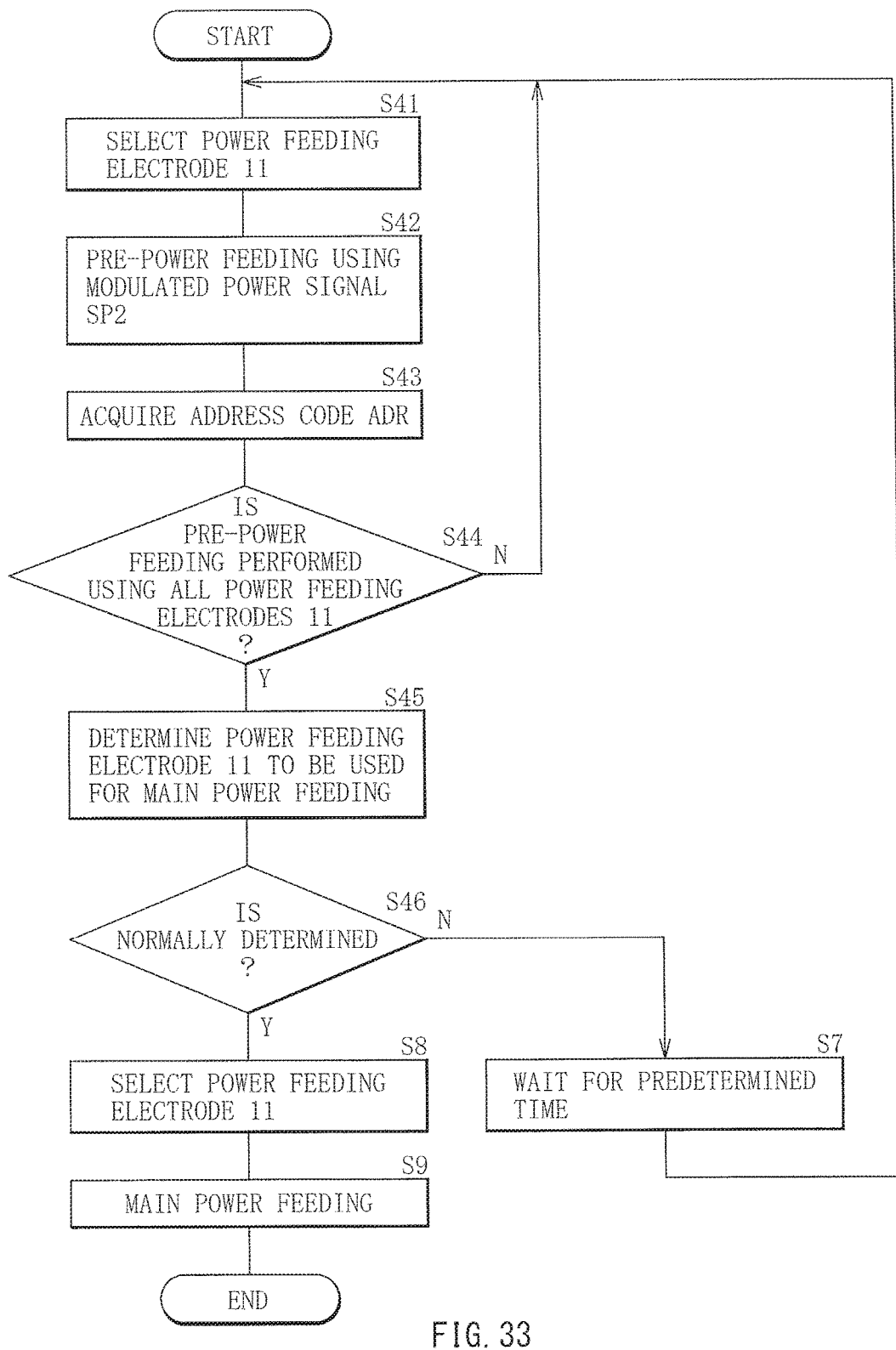
FIG. 33 is a flowchart illustrating an exemplary operation of the power feeding system illustrated in FIG. 30.

FIG. 33 is a flowchart illustrating an exemplary operation of the power feeding system 7.

First, the control section 99 controls the switch sections 18A and 18B via the switch control signals SSWA and SSWB to connect one of the power feeding electrodes 11 in the power feeding electrode array 12A to a first end of the power feeding section 97, and connect one of the power feeding electrodes 11 in the power feeding electrode array 12B to a second end of the power feeding section 97 (step S41).

Subsequently, the power feeding section 97 generates the modulated power signal SP2 based on the switch control signals SSWA and SSWB, and performs pre-power feeding to the mobile battery 120 using the modulated power signal SP2 (step S42).

Subsequently, the demodulation section 123 acquires the address code ADR (step S43). The communication section 121 of the mobile battery 120 supplies the address code ADR to the control section 99 via the communication section 91 of the power feeding unit 90.

Subsequently, the control section 99 checks whether or not the pre-power feeding is performed using all the power feeding electrodes 11 in the power feeding electrode arrays 12A and 12B (step S44). When the pre-power feeding is performed using all the power feeding electrodes 11, the process is advanced to step S45. When the pre-power feeding is not performed using all the power feeding electrodes 11, the process is returned to step S41, and the control section 99 selects another power feeding electrode 11. In this way, steps S41 to S44 are repeated until the pre-power feeding is performed using all the power feeding electrodes 11.

When the control section 99 confirms that the pre-power feeding is performed using all the power feeding electrodes 11 in step S44, the control section 99 determines power feeding electrodes 11 to be used for main power feeding based on the address code ADR acquired in steps S41 to S44 (step S45). Specifically, for example, the control section 99 may determine a power feeding electrode 11, the address code ADR for which has been acquired, as the power feeding electrode 11 to be used for main power feeding.

Subsequently, the control section 99 determines whether or not the power feeding electrodes 11 to be used for main power feeding are normally determined in step S45 as with step S6 in the first embodiment (step S46). When the control section 99 determines that the power feeding electrodes 11 to be used for power feeding are not allowed to be normally determined, the process is advanced to step S7, and steps S41 to S46 are repeated after waiting for a predetermined time. When the control section 99 determines that the power feeding electrodes 11 to be used for power feeding are normally determined, the control section 99 selects power feeding electrodes 11 (step S8), performs main power feeding to the mobile battery 120 (step S9), and finishes the flow, as in the case of the first embodiment.

In this way, in the power feeding system 7, pre-power feeding is performed every power feeding electrodes 11 before actual power feeding, and the power feeding electrodes 11 to be used for main power feeding are determined based on whether the address code ADR is acquired or not, i.e., based on whether the pre-power feeding is possible or not. Consequently, in the power feeding system 7, since the power feeding unit or the mobile battery is not necessary to have a wireless communication section unlike in the case of each of the first to fifth embodiments, a simple configuration is achieved.

As described above, in the seventh embodiment, since the power feeding electrodes to be used for main power feeding are determined based on whether the address code ADR is acquired or not, a simple configuration is achieved. Other effects are similar to those in the case of the first embodiment, etc.

[Modification 7-1]

Any of the Modifications of the first to sixth embodiments may be appropriately applied to the power feeding system 7 according to the seventh embodiment.

<Application Examples>

Application examples of the power feeding system described in any of the embodiments and the Modifications are now described.

Figure 34:
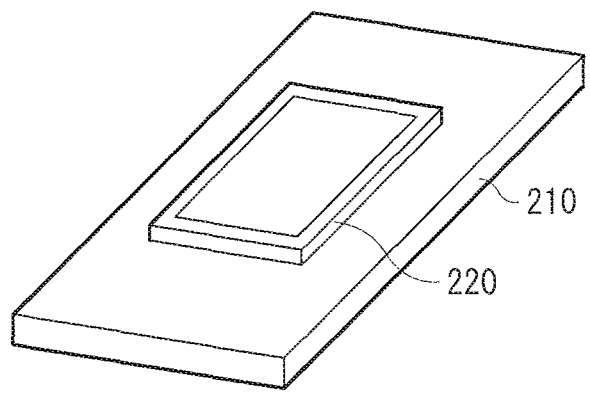
FIG. 34 is an explanatory diagram illustrating an application example of an embodiment.

FIG. 34 illustrates an application example of the power feeding system according to any of the embodiments and the Modifications. In this application example, a tray-type power feeding unit and a mobile phone 220 incorporating a battery are used to configure a power feeding system. The power feeding unit 210 and the mobile phone 220 are each configured of the power feeding system according to any of the embodiments and the Modifications.

The power supply system according to any of the embodiments and the Modifications is applicable to an electronic apparatus in any field. In addition to the mobile phone, examples of the electronic apparatus may include a digital camera, a video camcorder, a portable video game player, and a mobile storage. In other words, the power supply system according to any of the embodiments and the Modifications is applicable to an electronic apparatus including a battery in any field.

Although the present technology has been described with reference to the example embodiments, the Modifications, and the application examples directed to an electronic apparatus hereinbefore, the technology is not limited thereto, and various modifications or alterations thereof may be made.

Figure 35:
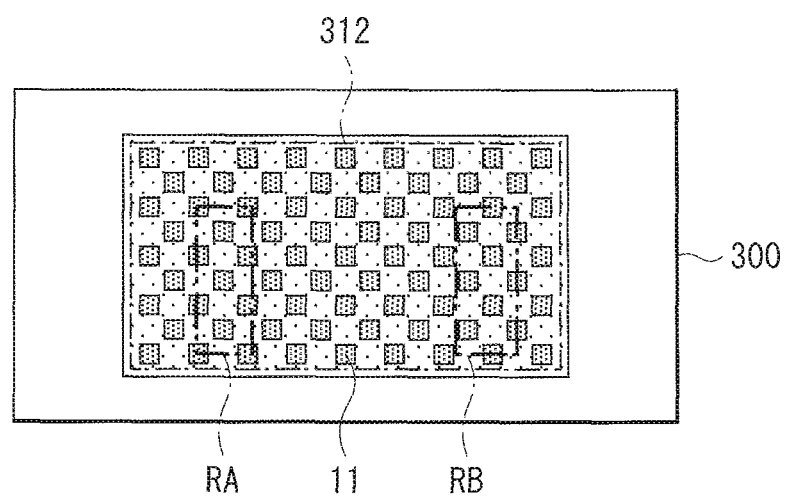
FIG. 35 is a plan diagram illustrating an exemplary configuration of a power feeding unit according to a modification.

For example, while the two power feeding electrode arrays 12A and 12B are provided in the embodiments and the Modifications, this is not limitative. Alternatively, for example, as illustrated in FIG. 35, one power feeding electrode array 312 may be provided. In this case, according to a method similar to that in any of the embodiments and the Modifications, for example, power feeding may also be performed to the mobile battery 20 only using the power feeding electrodes 11 opposed to the power receiving electrodes 21A and 21B of the mobile battery 20 among the power feeding electrodes 11 in the power feeding electrode array 312.

It is possible to achieve at least the following configurations from the above-described example embodiments of the disclosure.

(1) A power feeding unit, including:
an electrode array including a plurality of power feeding electrodes arranged side by side;
a power feeding section configured to supply power to a power receiving unit via the electrode array; and
a setting section configured to set a power feeding condition for each of the power feeding electrodes.

(2) The power feeding unit according to (1), wherein the setting section selects one or more power feeding electrodes to be used for power feeding among the plurality of power feeding electrodes.

(3) The power feeding unit according to (1) or (2), wherein the setting section sets power to be fed for each of the power feeding electrodes.

(4) The power feeding unit according to any one of (1) to (3), further including:
a plurality of antennas; and
a communication section configured to sequentially select one of the plurality of antennas to perform communication with a wireless unit,
wherein the setting section sets the power feeding condition based on a communication state between the wireless unit and the communication section.

(5) The power feeding unit according to any one of (1) to (3), further including a communication section configured to sequentially select one of the plurality of power feeding electrodes to perform communication with a wireless unit using the selected power feeding electrode as an antenna,
wherein the setting section sets the power feeding condition based on a communication state between the wireless unit and the communication section.

(6) The power feeding unit according to any one of (1) to (3), further including:
a plurality of antennas; and
a first communication section and a second communication section being configured to sequentially select respective mutually-different antennas of the plurality of antennas to perform communication with each other,
wherein the setting section sets the power feeding condition based on a communication state between the first communication section and the second communication section.

(7) The power feeding unit according to any one of (1) to (3), further including a first communication section and a second communication section being configured to sequentially select respective mutually-different power feeding electrodes of the plurality of power feeding electrodes to perform communication with each other using the selected power feeding electrodes as antennas,
wherein the setting section sets the power feeding condition based on a communication state between the first communication section and the second communication section.

(8) The power feeding unit according to any one of (4) to (7), wherein the setting section acquires the communication state based on one or both of field intensity and a transfer function.

(9) The power feeding unit according to any one of (4) to (8), wherein while the power feeding section supplies power to the power receiving unit, the power feeding section continues or stops power supply to the power receiving unit based on the communication state.

(10) The power feeding unit according to any one of (1) to (3), further including a plurality of electromagnetic field sensors,
wherein the power feeding section performs pre-power feeding while sequentially selected one of the plurality of power feeding electrodes before performing main power feeding, and
the setting section sets the power feeding condition based on detection results of the plurality of electromagnetic field sensors during the pre-power feeding.

(11) The power feeding unit according to (10), wherein the plurality of electromagnetic field sensors each detect a harmonic component of an electromagnetic field.

(12) The power feeding unit according to (11), wherein the power feeding section performs negative feedback control to allow the detected harmonic component to be decreased based on the harmonic component during performing the main power feeding.

(13) The power feeding unit according to any one of (1) to (12), wherein the power feeding section wirelessly supplies power to the power receiving unit through electric field coupling.

(14) A power feeding system, including:
a power feeding unit; and
a power receiving unit,
wherein the power feeding unit includes
an electrode array including a plurality of power feeding electrodes arranged side by side,
a power feeding section configured to supply power to the power receiving unit via the electrode array, and
a setting section configured to set a power feeding condition for each of the electrodes.

(15) The power feeding system according to (14), wherein the power receiving unit further includes:
a plurality of power receiving electrodes;
a first communication section configured to sequentially select one of the plurality of power receiving electrodes to perform communication with a wireless unit using the selected power receiving electrode as an antenna; and
a second communication section configured to transmit a communication state between the wireless unit and the first communication section to the setting section of the power feeding unit,
wherein the setting section sets the power feeding condition based on the communication state.

(16) The power feeding system according to (14), wherein the power feeding section performs pre-power feeding while sequentially selecting one of the plurality of power feeding electrodes before performing main power feeding, and notifying the power receiving unit of electrode identification information corresponding to the selected power feeding electrode.

(17) The power feeding system according to (16), wherein the power feeding section performs the pre-power feeding by supplying a power signal to the power receiving unit, the power signal being modulated based on the electrode identification information.

(18) The power feeding system according to (16) or (17), wherein the power receiving unit includes:
an identification information acquisition section configured to acquire the electrode identification information; and
a communication section configured to transmit the electrode identification information to the setting section of the power feeding unit,
wherein the setting section sets the power feeding condition based on the electrode identification information.

(19) The power feeding system according to any one of (14) to (18), wherein
the power feeding unit includes a predetermined number of electrode arrays,
the power receiving unit includes the predetermined number of power receiving electrodes, and
area of each of the electrode arrays is larger than area of each of the power receiving electrodes.

It should be understood by those skilled in the art that various modifications, combinations, sub-combinations and alterations may occur depending on design requirements and other factors insofar as they are within the scope of the appended claims or the equivalents thereof.

What is claimed is:
1. A power feeding unit, comprising:
an electrode array including a plurality of power feeding electrodes arranged side by side; a power feeding section configured to supply power to a power receiving unit via the electrode array;
a setting section configured to set a power feeding condition for each of the plurality of power feeding electrodes;
a plurality of antennas; and
a communication section configured to sequentially select one of the plurality of antennas to perform wireless communication with an access point,
wherein the setting section sets the power feeding condition based on a communication state between the access point and the communication section.

2. The power feeding unit according to claim 1, wherein the setting section selects one or more power feeding electrodes to be used for power feeding among the plurality of power feeding electrodes.

3. The power feeding unit according to claim 1, wherein the setting section sets power to be fed for each of the plurality of power feeding electrodes.

4. The power feeding unit according to claim 1, wherein the communication section is further configured to sequentially select one of the plurality of power feeding electrodes to perform the wireless communication with the access point using the selected power feeding electrode as an antenna between the wireless unit and the communication section.

5. The power feeding unit according to claim 1, further comprising:
a second communication section,
wherein the communication section and the second communication section are configured to sequentially select respective mutually-different antennas of the plurality of antennas to perform communication with each other,
wherein the setting section sets the power feeding condition based on a second communication state between the communication section and the second communication section.

6. The power feeding unit according to claim 1, further comprising a second communication section,
wherein the communication section and the second communication section are configured to sequentially select respective mutually-different power feeding electrodes of the plurality of power feeding electrodes to perform communication with each other using the selected power feeding electrodes as antennas, wherein the setting section sets the power feeding condition based on a second communication state between the communication section and the second communication section.

7. The power feeding unit according to claim 1, wherein the setting section acquires the communication state based on one or both of field intensity and a transfer function.

8. The power feeding unit according to claim 1, wherein while the power feeding section supplies power to the power receiving unit, the power feeding section continues or stops power supply to the power receiving unit based on the communication state.

9. The power feeding unit according to claim 1, further comprising a plurality of electromagnetic field sensors,
wherein the power feeding section performs pre-power feeding while sequentially selected one of the plurality of power feeding electrodes before performing a main power feeding, and
the setting section sets the power feeding condition based on detection results of the plurality of electromagnetic field sensors during the pre-power feeding.

10. The power feeding unit according to claim 9, wherein the plurality of electromagnetic field sensors each detect a harmonic component of an electromagnetic field.

11. The power feeding unit according to claim 10, wherein the power feeding section performs negative feedback control to allow the detected harmonic component to be decreased based on the harmonic component during performing the main power feeding.

12. The power feeding unit according to claim 1, wherein the power feeding section wirelessly supplies power to the power receiving unit through electric field coupling.

13. A power feeding system, comprising:
a power feeding unit; and
a power receiving unit,
wherein the power feeding unit includes
an electrode array including a plurality of power feeding electrodes arranged side by side,
a power feeding section configured to supply power to the power receiving unit via the electrode array,
a setting section configured to set a power feeding condition for each of the plurality of power feeding electrodes, a plurality of antennas, and
a communication section configured to sequentially select one of the plurality of antennas to perform wireless communication with an access point,
wherein the setting section sets the power feeding condition based on a communication state between the access point and the communication section.

14. The power feeding system according to claim 13, wherein the power receiving unit further comprises;
a plurality of power receiving electrodes;
a second communication section configured to sequentially select one of the plurality of power receiving electrodes to perform wireless communication with the access point using the selected power receiving electrode as an antenna; and
a third communication section configured to transmit a second communication state between the access point and the second communication section to the setting section of the power feeding unit,
wherein the setting section sets the power feeding condition based on the second communication state.

15. The power feeding system according to claim 13, wherein the power feeding section performs pre-power feeding while sequentially selecting one of the plurality of power feeding electrodes before performing a main power feeding, and notifies the power receiving unit of electrode identification information corresponding to the selected power feeding electrode.

16. The power feeding system according to claim 15, wherein the power feeding section performs the pre-power feeding by supplying a power signal to the power receiving unit, the power signal being modulated based on the electrode identification information.

17. The power feeding system according to claim 15, wherein the power receiving unit comprises:
an identification information acquisition section configured to acquire the electrode identification information; and
a second communication section configured to transmit the electrode identification information to the setting section of the power feeding unit, and
wherein the setting section sets the power feeding condition based on the electrode identification information.

18. The power feeding system according to claim 13, wherein
the power feeding unit includes a predetermined number of electrode arrays,
the power receiving unit includes a predetermined number of power receiving electrodes, and
an area of each of the predetermined number of electrode arrays is larger than an area of each of the predetermined number of power receiving electrodes.

* * * * *